US010504195B2

(12) United States Patent
Sun et al.

(10) Patent No.: US 10,504,195 B2
(45) Date of Patent: Dec. 10, 2019

(54) SYSTEM AND METHOD FOR DECENTRALIZED ENERGY PRODUCTION

(71) Applicant: Mitsubishi Electric Research Laboratories, Inc., Cambridge, MA (US)

(72) Inventors: Hongbo Sun, Lexington, MA (US); Chanaka Keerthisinghe, Auckland (NZ)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 151 days.

(21) Appl. No.: 15/810,262

(22) Filed: Nov. 13, 2017

(65) Prior Publication Data

US 2019/0147551 A1    May 16, 2019

(51) Int. Cl.
G06Q 50/06        (2012.01)
G06Q 30/02        (2012.01)
G06Q 10/04        (2012.01)
G06N 3/02         (2006.01)
G05B 13/02        (2006.01)
H02J 3/38         (2006.01)
G05F 1/66         (2006.01)
(Continued)

(52) U.S. Cl.
CPC ............ *G06Q 50/06* (2013.01); *G05B 13/02* (2013.01); *G05F 1/66* (2013.01); *G06N 3/02* (2013.01); *G06Q 10/04* (2013.01); *G06Q 30/0206* (2013.01); *H02J 3/00* (2013.01); *H02J 3/008* (2013.01); *H02J 3/382* (2013.01); *H02J 3/46* (2013.01); *H02J 2003/003* (2013.01)

(58) Field of Classification Search
CPC .... G06Q 50/06; G06Q 10/04; G06Q 30/0206; G05B 13/02; G06N 3/02
See application file for complete search history.

(56) References Cited

U.S. PATENT DOCUMENTS 5,974,403 A * 10/1999 Takriti ................. G06Q 10/06
                                                                 705/412
8,401,709 B2      3/2013 Cherian et al.
(Continued)

FOREIGN PATENT DOCUMENTS

EP        2533389 A2    4/2012
EP        2665149 A1    11/2013
WO    2013102932 A2    12/2012

*Primary Examiner* — Mark A Connolly
(74) *Attorney, Agent, or Firm* — Gennadiy Vinokur; James McAleenan; Hironori Tsukamoto

(57) ABSTRACT

A power generation system of a power producer for generating and providing electricity to an electric power system operated by an independent system operator (ISO). A processor determines a residual demand curve, at each time step of a future energy generation period, relating to a price and a quantity of a demanded energy for that time step. Determine a residual reserve curve at each time step of the future energy generation period, relating to a price and a quantity of a reserved energy for that time step. Determine a schedule of operations of a set of generators for each time step of the future energy generation period, by the power producer. A controller to control the set of generators to produce energy according to the schedule of operations, when the receiver receives an acceptance of the schedule of operations from the ISO.

23 Claims, 22 Drawing Sheets

(51) Int. Cl.
 *H02J 3/46* (2006.01)
 *H02J 3/00* (2006.01)

(56) References Cited

U.S. PATENT DOCUMENTS

| | | | |
|---|---|---|---|
| 2003/0182250 A1* | 9/2003 | Shihidehpour | G06N 3/02 |
| | | | 706/21 |
| 2003/0189420 A1 | 10/2003 | Hashimoto et al. | |
| 2004/0181491 A1 | 9/2004 | Sato et al. | |
| 2004/0215529 A1* | 10/2004 | Foster | G06Q 30/06 |
| | | | 705/26.1 |
| 2008/0167756 A1 | 7/2008 | Golden et al. | |
| 2013/0006439 A1 | 1/2013 | Selvaraj | |
| 2014/0142779 A1* | 5/2014 | Stoettrup | H02J 3/28 |
| | | | 700/297 |
| 2014/0278817 A1* | 9/2014 | Slutsker | G06Q 10/0637 |
| | | | 705/7.36 |
| 2017/0310115 A1 | 10/2017 | Miyake et al. | |
| 2018/0293674 A1* | 10/2018 | Bartone | G06Q 50/06 |
| 2019/0058331 A1* | 2/2019 | Fuchs | G05B 15/02 |

* cited by examiner

SYSTEM AND METHOD FOR DECENTRALIZED ENERGY PRODUCTION

FIELD

The present disclosure relates generally to electrical grids, and more particularly to systems and methods for controlling an amount of electricity produced by power producers to pass through an electrical grid.

BACKGROUND

Despite technological advances in developing renewable energy resources and in electricity grids, the current energy infrastructure of today suffer from many limitations requiring rapid improvement, as demand for such power increases, and regulatory requirements for use of "green" resources become more prominent, along with growing importance for grid security.

Power derived from renewable energy such as solar, wind, wave, and solar thermal resources are becoming increasingly relied upon, but each includes several limitations that impede them from becoming widespread, low-cost, efficient, and continually viable sources of electricity. Each is inherently unreliable, owing to factors such as changes in the time of day and variations in weather conditions that mean that maximized performance of components for each resource is very difficult to manage. Combining any of these together proves even more difficult to manage the inherent inefficiencies involved in operating devices and components to meet energy demand.

Nonetheless, requirements for using power generated from "clean" or "green" renewable resources are rapidly increasing. Enhanced ecological and environmental awareness, and a desire to reduce energy dependency on carbon-based fossil fuels and to decrease availability and price concerns resulting from exposure to geopolitical concerns, has led many governments to implement regulations that either dictate or impose limits on the amount of power produced and consumed that is generated from carbon-based or otherwise non-renewable energy sources. Because of this, there is a strong and continually developing need for efficient and cost-effective power generated from renewable energy resources.

In addition, an electrical grid is not a single entity but an aggregate of multiple networks and multiple power generation plants with multiple energy operators employing varying levels of communication and coordination. A smart grid increases connectivity, automation and coordination among power suppliers and power consumers and the networks that carry that power for performing either long-distance transmissions or local distribution.

The current conventional power distribution system involves multiple entities. For example, production of power may represent one entity; while the long distance transmission of power another. Each of these entities interacts with one or more distribution networks that ultimately deliver electricity to the consumer. While the divisions of control described herein are not absolute, they nonetheless represent a hurdle for dynamic control of power over a distributed power grid.

A number of limitations of the grid can impede a flow of electricity. For example, there may be time- and/or geographically-dependent limitations on ability of the grid to support transmission of electricity, based on one or more of: supply and demand for the electricity, general conditions on the grid itself, e.g., aging, failing or dated equipment, and location-specific or congestion issues. This problem becomes even more complicated with introduction of renewable, but unreliable, sources of the energy. For example, the power producer or the power consumer can act as a regional energy operator distributing energy between energy generators and loads located within a corresponding region. Due to various reasons, including unreliability of renewable source of the energy, the regional energy operator can be both the power producer and the power consumer at different point of time. For example, the regional energy operator is the power producer when the power generators of the region produce more energy than demanded by the loads in the regions. In contrast, the regional energy operator is the power consumer when the power generators of the region produce less energy than demanded by the loads in the regions. Such versatility disturbs the balance between the energy provided to an electrical grid and the energy consumed from the electrical grid.

Some methods determine and maintain the balance of energy flow in the electrical grid by determining the amount of energy each power producer or power consumer needs to supply or consume. For example, the method disclosed in U.S. Pat. No. 8,401,709 teaches the control system that collects all information from all energy operators to determine their corresponding amounts of energy. However, this method requires that each energy operator share all information with the control system, which can be undesirable in some situations due to the privacy constraints.

Accordingly, there is a need for controlling an amount of electricity passing through an electrical grid while preserving the privacy constraints of each power producer.

SUMMARY

The present disclosure relates to electrical grids, and more particularly to systems and methods for controlling an amount of electricity produced by power producers to pass through an electrical grid.

Some embodiments are based on recognition that different power producers can determine their corresponding quantities of generated energy on their own and/or independent from each other. In such a manner, each power producer can use its own or publically available data in a decentralize manner to preserve the privacy of individual power producer.

Some embodiments are based on recognition that the cost of energy production is sensitive to the amounts of produced energy. Specifically, the present disclosure realizes the sensibility for the power producer to schedule their energy production based on sensitivity of the amount of produced energy to the cost of production. However, some embodiments are based on realization that estimating the energy production based on direct sensitivity to their cost can be ineffective for some applications and can result in computationally demanding balancing problem performed by an independent system operator (ISO). That is, in part, because the power producers are requested to produce two different types of energy: first, the actual energy demanded by the consumers of the power grid, and second, the energy to be reserved among the power producers by the independent system operator for maintaining the stable operation of the power grid. Those two types of energy can have the same generation cost but different values in the energy marketplace.

For example, in the day-ahead electricity market, typical power producers look to submit optimal stepwise supply offer curves before a given time, such as 12 PM to the ISO.

Note that, the power producer's supply offers are in pairs of price and quantity for each time-step (demanded energy and reserved energy). For example, this can include from an hour up to a certain number of value pairs, i.e. this can depend on an ISO, that are arranged according to increasing prices. Further, this may include an ISO which may allow supply offers for demanded energy in up to 10 value pairs. In contrast, the supply offers for reserved energy are given as a single pair of price and quantity of reserved energy for each hour.

Some embodiments are based on realization the generations of the demanded energy and the reserved energy need to be jointly optimized. Such that, some embodiments of the present disclosure determine energy production based on sensitivity of the value function of the power producer from producing energy to the quantity of production. The value function of the power producer can be calculated by subtracting the cost of generation from the revenue from selling energy. Thus, the sensitivity of the value function also depends on the sensitivity to the cost of production to the quantity of production, but the resulting quantities reflect the differences in the demanded and reserved energy, and thus simplifies the energy balancing performed by ISO.

However, while the cost of production is independent from the situation on the energy market, the value function depends on market conditions, such as the market-clearing price on energy and/or offers from other power producers. Such information is not readily available and/or uncertain, thus the power producer cannot optimize its generation decisions due to the inaccurate calculation of revenues resulted from lack of information on market conditions.

Some embodiments are based on realization that the uncertain day-ahead market-clearing price and the competitors' behavior can be modeled in the form of residual curves. For each time-step, a residual curve defines the market clearing price as a monotonically non-increasing function of the power producer's energy quota. The quota of the power producer is quantity of energy produced by the power producer and defined as the total energy production cleared in the day-ahead market. The residual curves are obtained by subtracting the quantity offered by the competitors from the total cleared energy in the grid. When the residual curves are obtained, those curves can be used to ultimately define the relationship between the day-ahead market-clearing prices and the day-ahead energy quotas.

The residual curves typically include only curves for the energy supplied to the grid. These curves are referred herein as residual demand curves (RDCs). However, some embodiments are based on realization that the notion of the residual demand curves can be extended to the reserved energy market to be modeled in the form of residual reserve curves (RRCs). In theory, the spinning reserve can be predetermined in advance, but in practice, the reserves of power producers are also facing competition between power producers. Thus, some embodiments recognized that the residual reserve curves can also model the market clearing reserve price as a function of the power producer's reserve quota. In such a manner, the residual demand and reserve curves can serve as the constraints for joint optimization of the demanded and reserved energy. Using residual demand curves and residual reserve curves simultaneously, we can guarantee the joint optimization for supplying both demanded and reserve energy in an integrated demanded energy and reserved energy market.

Some embodiments are based on recognition that residual curves can span through the entire range of energy production. For example, the energy production jointly optimizing demanded and reserved energy can be modeled as non-linear stochastic optimization problem to be solved. However, the solution techniques for solving such non-linear stochastic optimization problems, such as mixed integer linear programming techniques, are computationally extensive, i.e., require extensive computational power and memory usage.

Thus, some embodiments are based on recognition that the residual curves are functions of market demands, and thus the market demands themselves can limit the search space for optimal quantity of production. Such that, some embodiments use historical data to estimate the required quantity of the energy demanded by the grid and to be reserved by the power producer, and perform the joint optimization of the energy production within the neighborhood of the determined quantities. In such a manner, the computational requirements for scheduling the operations of the power producer can be reduced, and then the power producer can solve the joint-optimization problem with less time.

According to an embodiment of the disclosure, a power generation system of a power producer for generating and providing electricity to an electric power system operated by an independent system operator (ISO). Wherein multiple power producers supply the electricity to the electric power system and multiple power consumers demand the electricity from the electric power system. The power generation system of the power producer including a set of generators of the power producer. A receiver to receive a forecast of a demanded energy quantity for the electric power system from the ISO for a future energy generation period, and to receive a forecast of a reserved energy quantity for the electric power system from the ISO for the future energy generation period. A processor in communication with the receiver, is configured to determine a residual demand curve, at each time step of the future energy generation period, relating to a price and a quantity of the demanded energy for that time step, based on the received forecast of the demanded energy for each time step. Wherein the residual demand curve includes pluralities of sections, such that a section includes a most likely quantity of the demanded energy for the power producer. Determine a residual reserve curve at each time step of the future energy generation period, relating to a price and a quantity of the reserved energy for that time step, based on the received forecast of the reserved energy for each time step. Wherein the residual reserve curve includes pluralities of sections, such that a section includes a most likely quantity of the reserved energy for the power producer. Determine a schedule of operations of the set of generators for each time step of the future energy generation period, by optimizing a value function of a difference between a revenue from generating the demanded energy and the reserved energy, and a cost of producing the generated energy, by the power producer. Wherein the revenue for generating each quantity of the demanded energy is determined according to the residual demand curve, and the revenue for generating each quantity of the reserved energy is determined according to the residual reserve curve. Wherein the cost of producing each quantity of the generated energy depends on a state of each generator of the set of generators. Such that the value function optimization is subject to both constraints on an operation of the generators, and constraints on the quantities of the generated energy, as well as subject to the sections of the residual demand curve and the sections of the residual reserve curve. A controller to control the set of generators to produce energy according to the schedule of operations, when the receiver receives an acceptance of the schedule of operations from the ISO.

According to an embodiment of the disclosure, an energy generation system of a power producer for generating and providing electricity to an electric power system operated by an independent system operator (ISO). Wherein multiple power producers supply the electricity to the electric power system and multiple power consumers demand the electricity from the electric power system. The energy generation system of the power producer having a set of generators of the power producer. A receiver to receive a forecast of a demanded energy quantity for the electric power system from the ISO for a future energy generation period, and to receive a forecast of a reserved energy quantity for the electric power system from the ISO for the future energy generation period. The energy generation system of the power producer including a processor in communication with the receiver. The processor is configured to determine a residual demand curve, at each time step of the future energy generation period, relating to a price and a quantity of the demanded energy for that time step, based on the received forecast of the demanded energy for each time step. Wherein the future energy generation period is at least a day-ahead period wherein the residual demand curve includes pluralities of sections, such that a section includes a most likely quantity of the demanded energy for the power producer. Determine a residual reserve curve at each time step of the future energy generation period, relating to a price and a quantity of the reserved energy for that time step, based on the received forecast of the reserved energy for each time step. Wherein the residual reserve curve includes pluralities of sections, such that a section includes a most likely quantity of the reserved energy for the power producer. Determine a schedule of operations of the set of generators for each time step of the future energy generation period, by optimizing a value function of a difference between a revenue from generating the demanded energy and the reserved energy, and a cost of producing the generated energy, by the power producer. Wherein the revenue for generating each quantity of the demanded energy is determined according to the residual demand curve, and the revenue for generating each quantity of the reserved energy is determined according to the residual reserve curve. Wherein the cost of producing each quantity of the generated energy depends on a state of each generator of the set of generators. Such that the value function optimization is subject to both constraints on an operation of the generators, and constraints on the quantities of the generated energy, as well as subject to the sections of the residual demand curve and the sections of the residual reserve curve. A controller to control the set of generators to produce energy according to the schedule of operations, when the receiver receives an acceptance of the schedule of operations from the ISO.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

Figure 1A:
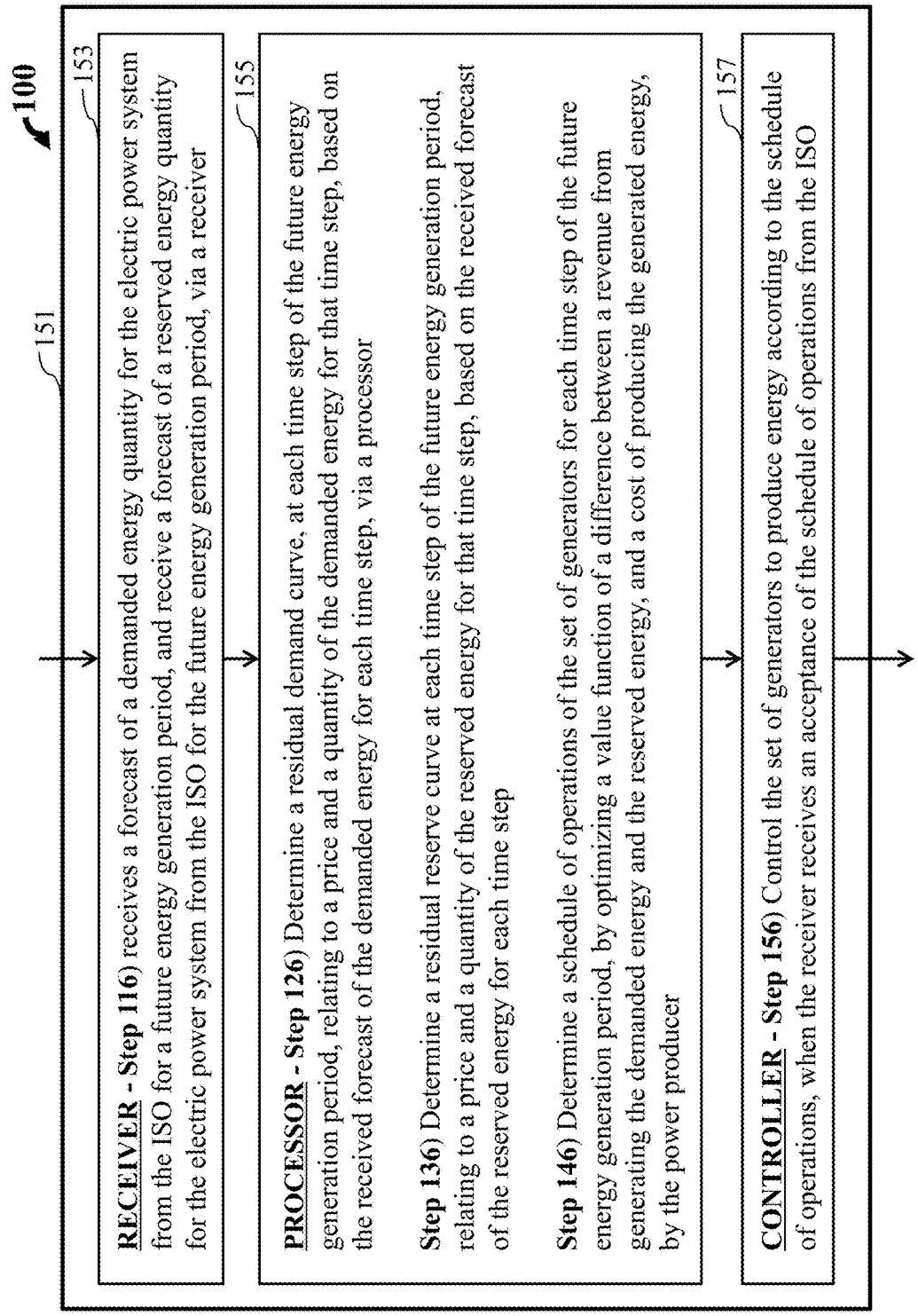
FIG. 1A is a schematic block diagram of some steps of a power generation system of a power producer for generating and providing electricity to an electric power system, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

The present disclosure relates to electrical grids, and more particularly to controlling an amount of electricity produced by power producers to pass through an electrical grid.

Embodiments of the present disclosure are based on recognition that different power producers can determine their corresponding quantities of generated energy on their own and/or independent from each other. In such a manner, each power producer can use its own or publically available data in a decentralize manner to preserve the privacy of individual power producer.

Some embodiments are based on recognition that the cost of energy production is sensitive to the amounts of produced energy. Specifically, it is reasonable for the power producer to schedule its energy production based on sensitivity of the amount of produced energy to the cost of production. However, some embodiments are based on realization that estimating the energy production based on direct sensitivity to its cost is ineffective and can result in computationally demanding balancing problem performed by an independent system operator (ISO). This is in part because the power producers are requested to produce two different types of energy: the actual energy demanded by the consumers of the power grid and the energy to be reserved in power producers by the independent system operator for maintaining system stable operation. Those two types of energy can have the same generation cost but different value in the energy marketplace.

For example, in the day-ahead electricity market, typical power producers aim to submit optimal stepwise supply offer curves before a given time, such as 12 PM to the ISO. Note that the power producer's supply offers are in pairs of price and quantity for each time-step, for example one hour in up to a certain number of value pairs (i.e. depends on an ISO) that are arranged according to increasing prices. For example, an ISO can allow supply offers in up to 10 value pairs. In contrast, the reserve offers are given as a single pair of price and reserve quantity of energy for each hour.

Some embodiments are based on realization that the generations of the demanded energy and the reserved energy need to be jointly optimized. To that end, some embodiments determine energy production based on sensitivity of the value function of the power producer from producing energy to the quantity of production. The value function of the power producer can be calculated by subtracting the cost of generation from the revenue from selling energy. Thus, the sensitivity of the value function also depends on the sensitivity to the cost of production to the quantity of production, but the resulting quantities reflect the differences in the demanded and reserved energy, and thus simplifies the energy balancing performed by ISO.

However, while the cost of production is independent from the situation on the energy market, the value function depends on market conditions, such as the market-clearing price on energy and/or offers from other power producers. Such information is not readily available and/or uncertain.

Some embodiments are based on realization that the uncertain day-ahead market-clearing price and the competitors' behavior can be modeled in the form of residual curves. For each time-step, a residual curve defines the market clearing price as a monotonically non-increasing function of the power producer's energy quota. The energy quota of the power producer is quantity of energy produced by the power producer and defined as the total energy production cleared in the day-ahead market. The residual curves are obtained by subtracting the quantity offered by the competitors from the total cleared energy in the grid.

The residual curves typically include only curves for the energy supplied to the grid. These curves are referred herein as residual demand curves (RDCs). However, some embodiments are based on realization that the notion of the residual demand curves can be extended to the reserved energy market to be modeled in the form of residual reserve curves (RRCs). In theory, the spinning reserve can be predetermined in advance, but in practice, the reserves of power producers are also facing competition between power producers. Thus, some embodiments recognized that the residual reserve curves can also model the market clearing reserve price as a function of the power producer's reserve quota. In such a manner, the residual demand and reserve curves can serve as the constraints for joint optimization of the demanded and reserved energy.

Some embodiments are based on recognition that residual curves can span through the entire range of energy production. For example, the energy production jointly optimizing demanded and reserved energy can be modeled as non-linear stochastic optimization problem to be solved. However, the solution techniques for solving such non-linear stochastic optimization problems, such as mixed integer linear programming techniques, are computationally extensive, i.e., require extensive computational power and memory usage.

However, some embodiments are based on recognition that the residual curves are functions of market demands, and thus the market demands themselves can limit the search space for optimal quantity of production. To that end, some embodiments use historical data to estimate the required quantity of the energy demanded by the grid and to be reserved by the power producer, and perform the joint optimization of the energy production within the neighborhood of the determined quantities. In such a manner, the computational requirements for scheduling the operations of the power producer can be reduced.

FIG. 1A is a schematic block diagram of some steps of a power generation system of a power producer for generating and providing electricity to an electric power system, according to some embodiments of the present disclosure. The power generation system of a power producer 100 is for generating and providing electricity to an electric power system operated by an independent system operator (ISO). Wherein multiple power producers supply the electricity to the electric power system and multiple power consumers demand the electricity from the electric power system. The power generation system of the power producer including a set of generators of the power producer. The power generation system of the power producer can include a computer 151 or like device, or multiple computers. It is contemplated the computer(s) can be located at different locations, and in communication with each other. Further, other components of the computer may be located at other locations, but are connected via a network, or some like arrangement.

Step 116 of FIG. 1A, includes receiving, via a receiver 153, a forecast of a demanded energy quantity for the electric power system from the ISO for a future energy generation period, and to receive a forecast of a reserved energy quantity for the electric power system from the ISO for the future energy generation period.

Step 126 of FIG. 1A, includes a processor 155 in communication with the receiver 153, is configured to determine a residual demand curve, at each time step of the future energy generation period, relating to a price and a quantity of the demanded energy for that time step, based on the received forecast of the demanded energy for each time step. Wherein the residual demand curve includes pluralities of sections, such that a section includes a most likely quantity of the demanded energy for the power producer.

Step 136 of FIG. 1A, is processed using the processor 155 to determine a residual reserve curve at each time step of the future energy generation period, relating to a price and a quantity of the reserved energy for that time step, based on the received forecast of the reserved energy for each time step. Wherein the residual reserve curve includes pluralities of sections, such that a section includes a most likely quantity of the reserved energy for the power producer. It is contemplated that multiple processors may be used depending upon the application.

Step 146 of FIG. 1A, is processed using the processor 155 to determine a schedule of operations of the set of generators for each time step of the future energy generation period, by optimizing a value function of a difference between a revenue from generating the demanded energy and the reserved energy, and a cost of producing the generated energy, by the power producer. Wherein the revenue for generating each quantity of the demanded energy is determined according to the residual demand curve, and the revenue for generating each quantity of the reserved energy is determined according to the residual reserve curve. Wherein the cost of producing each quantity of the generated energy depends on a state of each generator of the set of generators. Such that the value function optimization is subject to both constraints on an operation of the generators, and constraints on the quantities of the generated energy, as well as subject to the sections of the residual demand curve and the sections of the residual reserve curve.

Step 156 of FIG. 1A, includes a controller 157 that can be used to control the set of generators to produce energy according to the schedule of operations, when the receiver receives an acceptance of the schedule of operations from the ISO. Again, it is contemplated that multiple controllers can be used depending upon the application, along that the multiple controllers can be differently located.

Figure 1B:
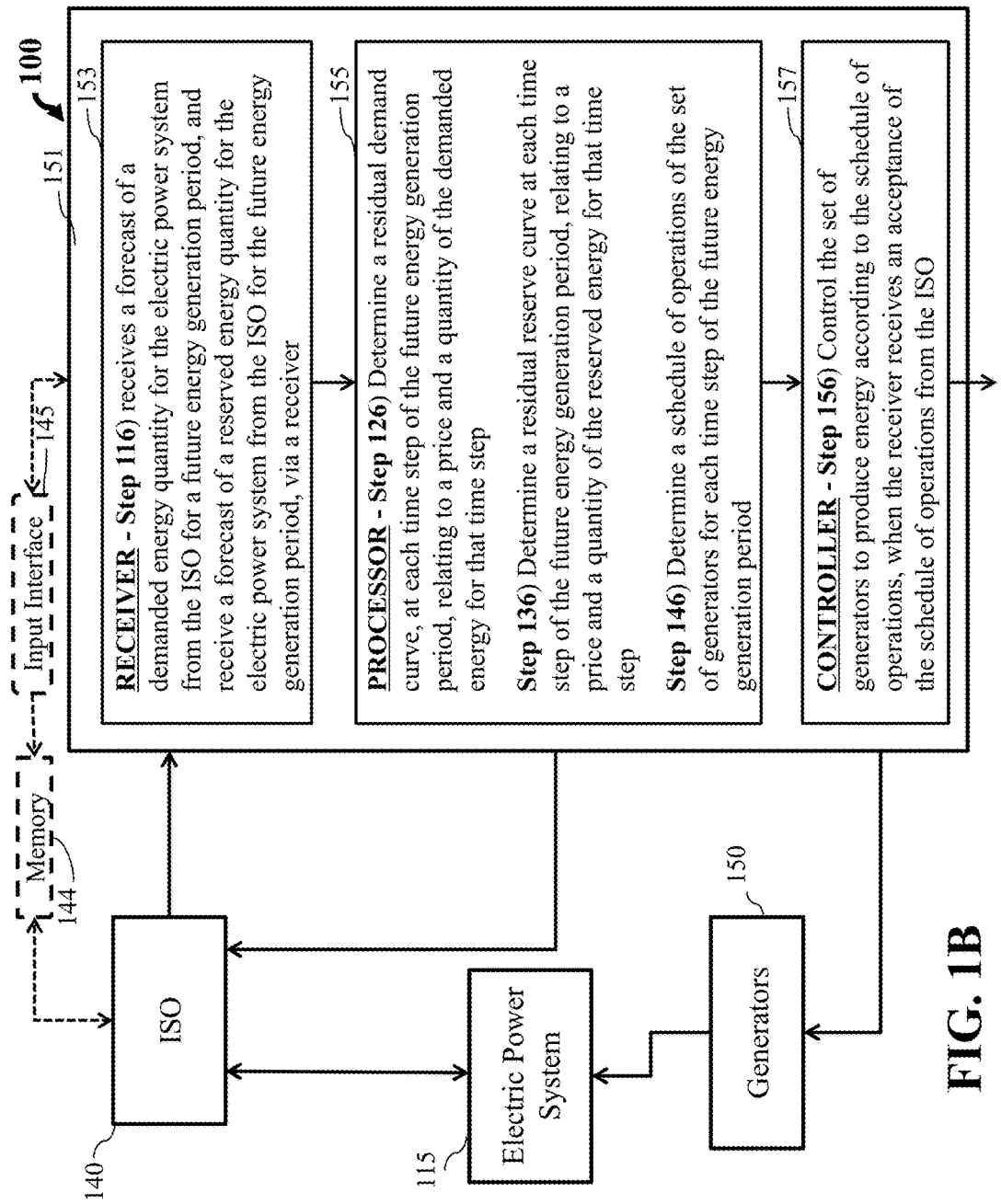
FIG. 1B is a schematic illustrating components and steps of the power generation system of the power producer for generating and providing electricity to the electric power system, according to some embodiments of the present disclosure.

FIG. 1B is a schematic illustrating components and steps of the power generation system of the power producer for generating and providing electricity to the electric power system, according to some embodiments of the present disclosure.

The power generation system of the power producer 100 generates and provides electricity to the electric power system 115 that can be operated by an independent system operator (ISO) 140. The power generation system of the power producer 100 can include a set of generators 150, and a computer 151 or like device, or multiple computers.

Still referring to FIG. 1B, the receiver 153 of the power generation system receives a forecast of a demanded energy quantity for the electric power system from the ISO for a future energy generation period, and to receive a forecast of a reserved energy quantity for the electric power system from the ISO for the future energy generation period (step 116).

The processor 155 then, in communication with the receiver 153, determines the residual demand curve, at each time step of the future energy generation period, relating to a price and a quantity of the demanded energy for that time step, based on the received forecast of the demanded energy for each time step (step 126), and determines a residual reserve curve at each time step of the future energy generation period, relating to a price and a quantity of the reserved energy for that time step, based on the received forecast of the reserved energy for each time step (step 136). After the residual demand and residual reserve curve are determined, the processor 155 determines the schedule of operations of the set of generators for each time step of the future energy generation period, by optimizing a value function of a difference between a revenue from generating the demanded energy and the reserved energy, and a cost of producing the generated energy, by the power producer (step 146).

Still referring to FIG. 1B, the power generation system of the power producer 100 sends the determined schedule of operations of the set of generators for each time step of the future energy generation period to the ISO 140, and the controller 157 controls the set of generators 150 to produce energy according to the schedule of operations, when the approval for the determined schedule is received via the receiver 153 from the ISO 140 (step 156).

Optionally, the power generation system of the power producer 100 can store the competitor's supply offer curves, system energy and price data in a computer readable memory 144, wherein the computer readable memory is in communication with the processor 155 and controller 157. Further, it is possible an input interface 145 can be in communication with the memory 144 and the processor 155 and controller 157. For example, a user via a user interface of the input interface 145 may input predetermined conditions, i.e. the forward contract quantities and prices, and the predetermined threshold for value function mismatches. It is contemplated the receiver, processor and controller could be a single computer system or multiple computer systems located at different locations depending on the specific application(s).

Figure 1C:
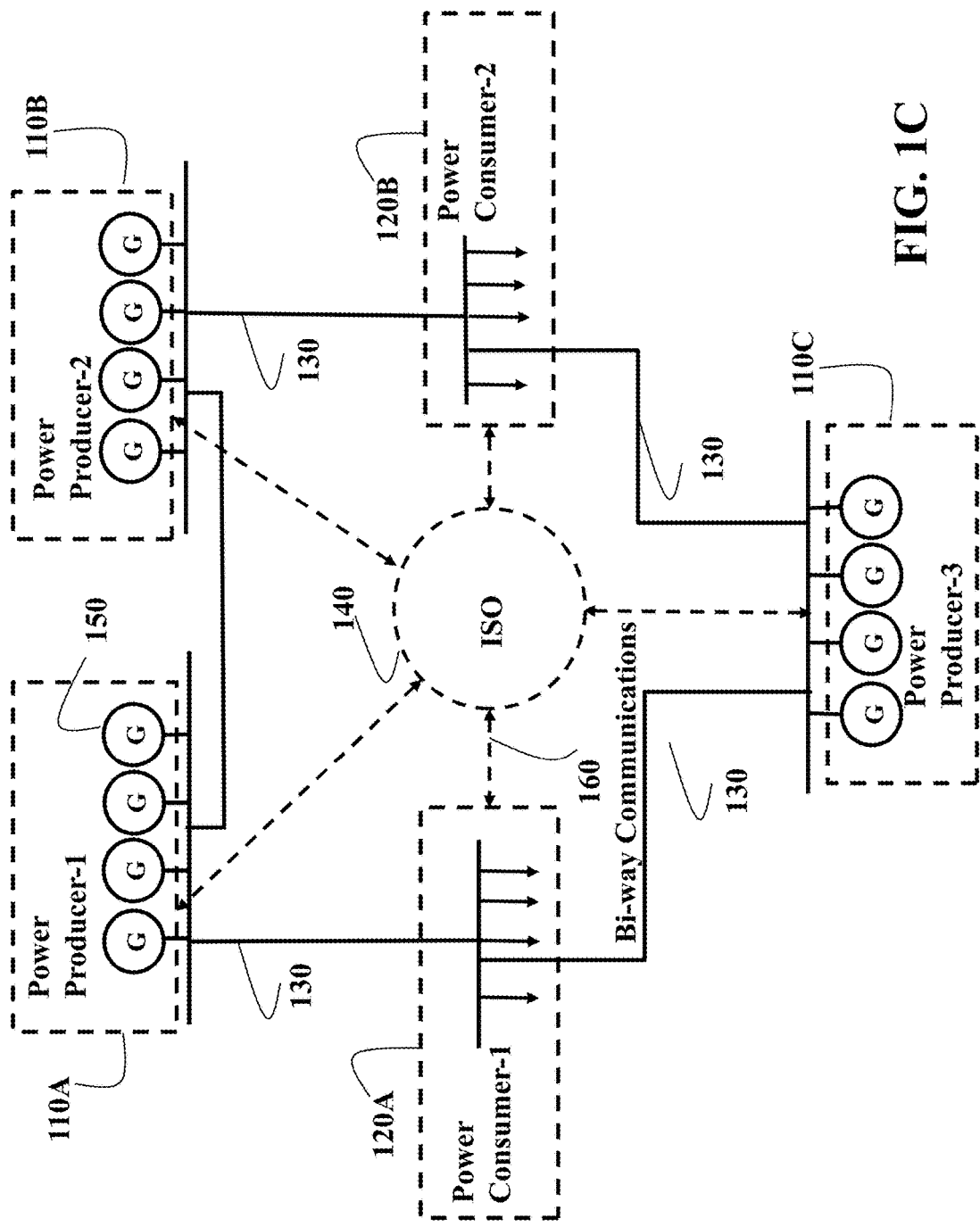
FIG. 1C is a schematic illustrating a power producer connected with a power system regulated by an independent system operator (ISO), according to some embodiments of the present disclosure.

FIG. 1C is a schematic illustrating a power producer connected with a power system regulated by an independent system operator (ISO), according to some embodiments of the present disclosure. In particular, FIG. 1C shows an electric power system under an electricity market environment. The electric power system can include a set of power plants that produce powers for the system, called power producers, 110A, 110B and 110C. Each power producer 110A, 110B and 110C may have multiple generation units, or called generators, 150. The electric power system can also include a set of end-users, called power consumers, 120A, 120B to consume the powers provided by the power producers 110A, 110B and 110C through the network connected by transmission lines, 130. An independent system operator (ISO), 140 is responsible for the coordination between producers and consumers to maintain stable operation of the electric power system. A communication network may be used for exchanging information between the ISO and the producers, or the consumers through communication links, 160. In FIG. 1C, as an example, there are 3 power producers 110A, 110B and 110C, 2 power consumers 120A, 120B, and 5 transmission lines 130. Each producer 110A, 110B and 110C can have 4 generators. The generation scheduling of power producers can be determined by the ISO in a centralized manner or by the power producer itself in a distributed way. An aspect of the present disclosure focuses on optimal self-scheduling of a power producer.

Deregulated electricity markets facilitate competition among power producers, which is ultimately expected to reduce the cost of electricity for the end-users. In a competitive electricity market, the aim of a power producer is to maximize its financial benefits by self-scheduling of their generators in both the day-ahead and real-time demanded energy and reserved energy markets. The present disclosure focuses on power producers who are price makers for convenience. However, the methods of the present disclosure can easily be used for both price takers and price makers. Note that, the price makers have the power to influence market clearing prices (MCPs), while the price takers can use their estimated market clearing prices in the scheduling problem.

Still referring to FIG. 1C, in the day-ahead electricity market, power producers aim to submit optimal stepwise supply offer curves before a given time, such as 12 PM to the independent system operator. Note that, the power producer's supply offers that are in pairs of price and quantity for each time-step. For example, one hour in up to a certain number of steps (i.e. depends on the ISO) that are arranged according to increasing prices. Also, an ISO can allow supply offers in up to 10 steps. Reserve offers are given as a single pair or pairs of price and reserve power for each hour. Power producers obtain these offers by self-scheduling their generators under uncertain market clearing demand and reserve prices, weather forecast and competitor offers.

The aim of the self-scheduling problem is to maximize the net profit of the power producer, which is calculated by subtracting the cost of generating power from the revenue from selling power. The cost of power generation includes operating costs, fixed costs and start/shut-down costs. The revenue from selling power is calculated by multiplication of the price and the energy sold that makes it non-linear. The constraints are power generation limits, minimum committed/de-committed times, ramp up/down rates of the generators, and capacity limits for transmission lines connected with the power producer. Some of these constraints are also non-linear.

The power producer's self-scheduling can be modeled as non-linear stochastic optimization problem to be solved. The widely solution techniques include mixed integer linear programming (MILP), and dynamic programming approaches. MILP solvers results in fixed generation schedules for each hour so it does not help with making real-time decisions under uncertainty. Moreover, residual demand curves, residual reserve curves and non-linear constraints will have to be approximated as stepwise or piece-wise linear curves. The number of integer variables increases as we make better approximations to the non-linear constraints, residual reserve curves and residual demand curves, and as a consequence, the computational time increases dramatically. Dynamic programming results in optimal solutions, and provides a perfect tool to make real-time decisions under uncertainty. However, it suffers from dimensionalities of state, decision and outcome spaces.

Still referring to FIG. 1C, the uncertain day-ahead market clearing price and the competitors' behavior can be modeled in the form of residual demand curves (RDCs). A residual demand curve defines the market clearing price for the demanded energy as a monotonically non-increasing function of the power producer's quota for demanded energy for each time-step. The quota of the power producer is defined as the total energy production cleared in the day-ahead market. The residual demand curves are obtained by subtracting the quantity offered by the competitors from the total cleared demand. A range of different approaches have been proposed to estimate residual demand curves. For example, residual demand curves are obtained assuming previous days' combined competitors' offer curve and non-parametric approaches. The power producers competitively update their day-ahead offers depending on the demand forecast, weather and competitors' behavior. However, in some electricity markets, daily energy market offer data are only available after a certain period, for example four months' delay. Assuming competitors' supply offer curves from months ago results in low quality solutions. Conventionally, the reserve is assumed to be known in advance, but in practical the reserves of power producers are also facing competition between power producers. It is desired to extend the concept of residual demand curves to reserves and use the residual reserve curves (RRCs) to model the market clearing price for reserved energy as a function of the power producer's quota for reserved energy.

The present disclosure discloses a method for controlling generation scheduling of a power producer which includes a set of generators and physically connects to an electric power system through transmission lines, wherein the electric power system is operated by an independent system operator (ISO), and have at least one more power producer producing powers and at least one power consumer consuming powers, wherein the power producer communicates with the ISO through bi-way communication links. It models the power producer's self-scheduling problem as a Markov decision process, and solve it using a machine learning based state-space approximate dynamic programming approach, and the residual demand reserve curve, and residual reserve curves created by using a clustering based artificial neural networks approach are used to model the relationship between the market clearing demand and reserve prices and the power producer's demand and reserve quotas under uncertain competitor's behaviors.

Still referring to FIG. 1C, the possible cleared demand and reserve quota for the power producer for the next-day is estimated using a feed-forward neural network model. The neural network is configured to take hourly market clearing demand price, hourly market clearing reserve price, total system demands, and total system reserve requirements as inputs, and hourly demand quotas, hourly reserve quotas, and hourly reserve used ratios for the producer as outputs. The neural network is trained with a set of historical data set for a period of days, wherein each data set corresponding to a specific day includes hourly market clearing demand price, hourly market clearing reserve price, total system demands, and total system reserve requirements as inputs, and hourly demand quotas, hourly reserve quotas, and hourly reserve used ratios for the producer as outputs. Then possible cleared hourly demand quotas, and hourly reserve quotas can be determined for the producer for next day based on the outputs of the trained neural network generated by fed into predicted hourly market clearing demand price, predicted hourly market clearing reserve price, total system demand forecast, and total system reserve requirement forecast as inputs. The possible cleared demand and reserve quota for the power producer for the next-day can be obtained by predicting all time steps of the next day simultaneously using one neural network, or by predicting each time step of the next day separately using an independent neural network for each time step.

During the dynamic programming process, the value functions are generated for every time-step in the decision horizon to represent the expected future benefit from all the possible demand and reserve quota, and possible generator status combinations. These value functions are used to generate optimal bidding curves for the day-ahead market for the power producer; and assist with real-time decisions and real-time bidding to stay optimal under uncertainty. At each time-step in the real-time market, the power producer can use the value functions to determine their optimal demand quota and reserve quota for the next time-step given the current generation by solving Bellman optimality condition. The current generation depends on the amount of demand quota and reserve quota that were accepted by the ISO in the day-ahead market and the amount of reserve used which are not predictable. Given this, the power producer can adjust their prices in the real-time market and make the best generation decisions to stay optimal according to Bellman's optimality condition.

Figure 2:
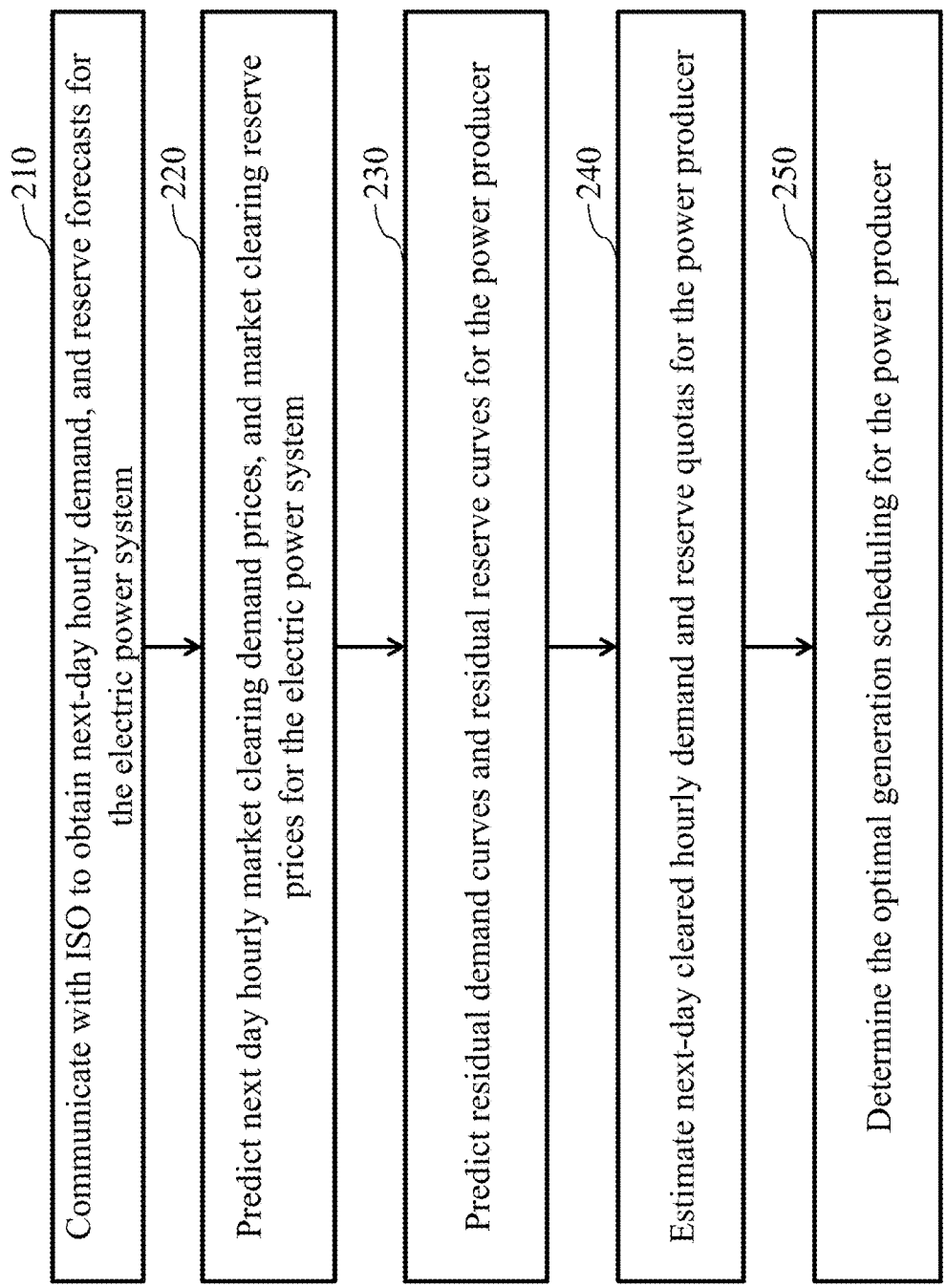
FIG. 2 is a block diagram illustrating some method steps for determining a self-scheduling plan for the power producer to use machine learning based approximate state-space dynamic programming method, according to some embodiments of the present disclosure.

FIG. 2 is a block diagram illustrating some method steps for determining a self-scheduling plan for the power producer to use machine learning based approximate state-space dynamic programming method, according to some embodiments of the present disclosure.

FIG. 2 illustrates solving self-scheduling of a power producer through a set of consecutive steps, including communicating with ISO to obtain a total demand forecast, and a total reserve forecast for the electric power system for each hour of the next day (step 210); predicting a market clearing demand price, and a market clearing reserve price for each hour of next day according to data obtained from ISO (step 220); based on predicted market clearing demand and reserve prices and historical competitors' demand and reserve supply offer curves, predicting a residual demand curve and a residual reserve curve for each hour of next day for the power producer (step 230); estimating possible cleared demand and reserve quotas for each hour of next day for the power producer based on historical power producer's cleared demand and reserve, and obtained system demand and reserve requirement forecasts (step 240); and determining an optimal generation scheduling and hourly demand-reserve bid-points for the power producer for the next day (step 250).

Step 250 of FIG. 2 can be implemented using a dynamic programming approach for facilitating accurate modelling the non-linear constraints of the self-scheduling problem and all the necessary points in the residual demand and reserve curves. The computation efforts are further reduced by incorporating machine learning based state space approximation strategy to reduce the demand and reserve quota states so only the desired states are looped over, but the quality of the solutions have not been reduced. Using this state space approximation strategy, only the demand and reserve quota states that are close to the estimated cleared demand and reserve quota states are kept during dynamic programming.

Modeling of Residual Demand and Reserve Curves Through Machine Learning

The present disclosure uses residual reserve curves (RRCs) to model the reserve price as a function of the power producer's quota for reserved energy, besides residual demand curves (RDCs) that models the uncertain market clearing demand price as a function of the power producer's quota for demanded energy. Both residual reserve curves and residual demand curves are estimated using a clustering based artificial neural networks (ANN) approach, which results in better estimates than using only a non-parametric approach. Taken residual demand curves as example, a power producer's residual demand curve can be obtained through the following procedure: The historical individual demand supply offer curves are firstly combined and clustered according to the corresponding market clearing demand price of the next day. During the day-ahead optimization, the power producer's estimated market clearing price is used to choose the corresponding cluster. Within this cluster, the artificial neural networks are used to train a model that maps combined competitor's demand supply offer curves with the total system demands and demand prices. The trained non-parametric model is used to estimate the day-ahead combined supply offer curve given the system demand forecast from the ISO, or estimated from demand bids, and generate RDCs for every time-step.

The prediction of a residual demand curve for each hour of next day for the power producer can be implemented by executing following steps sequentially, including determining the combined competitors' demand supply offer curves for the said hour over a period of days by adding the individual power producer's demand supply offers and setting the maximum limit of the combined demand supply offer curves with the day-ahead cleared demand from the ISO; partitioning the combined competitors' demand supply offer curves into a set of clusters according to the corresponding market clearing demand price using a k-means algorithm based Euclidean distance; using the estimated market clearing demand price to identify the cluster with corresponding combined competitors' demand supply offer curves; training a feed-forward neural network model to map the competitors' demand supply offer curves with the corresponding demand price for the chosen cluster, wherein the outputs for the network are the hourly demand quotas and hourly demand prices, and the inputs for the network are the market clearing demand price, and total system demand; estimating the combined demand supply offer curve using the trained neural network model based on the day-ahead market clearing demand price and total demand forecasts; and determining residual demand curves by subtracting the estimated combined competitors' demand supply offer curve from the day-ahead cleared system demand estimate.

Similarly, the residual reserve curve for each hour of next day for the power producer can be determined using following steps, including determining the combined competitors' reserve supply offer curves for the said hour over a period of days by adding the individual power producer reserve supply offers and setting the maximum limit of the combined reserve supply offer curves with the day-ahead cleared reserve forecast from the ISO; partitioning the combined competitors' reserve supply offer curves into a set of clusters according to the corresponding market clearing reserve price using a k-means algorithm based Euclidean distance; using the estimated market clearing reserve price to identify the cluster with corresponding combined competitors' reserve supply offer curves; training a feed-forward neural network model to map the competitors' reserve supply offer curves with the corresponding price for the chosen cluster, wherein the outputs for the network are the hourly reserve quotas and hourly reserve prices, and the inputs for the network are the market clearing reserve price, and total system reserve; estimating the combined reserve supply offer curve using the trained neural network model based on the day-ahead market clearing reserve price and total reserve requirement; and determining residual reserve curves by subtracting the estimated combined competitors' reserve supply offer curve from the day-ahead cleared reserve estimate.

The residual demand and reserve curves are determined based on the historical supply curves clustered according to the market clearing demand and reserve prices. In order to choose the right cluster, the market clearing prices for next day have to be predicted first. The market clearing demand and reserve prices are both predicted using feed-forward neural network models but with different configuration.

Figure 3A:
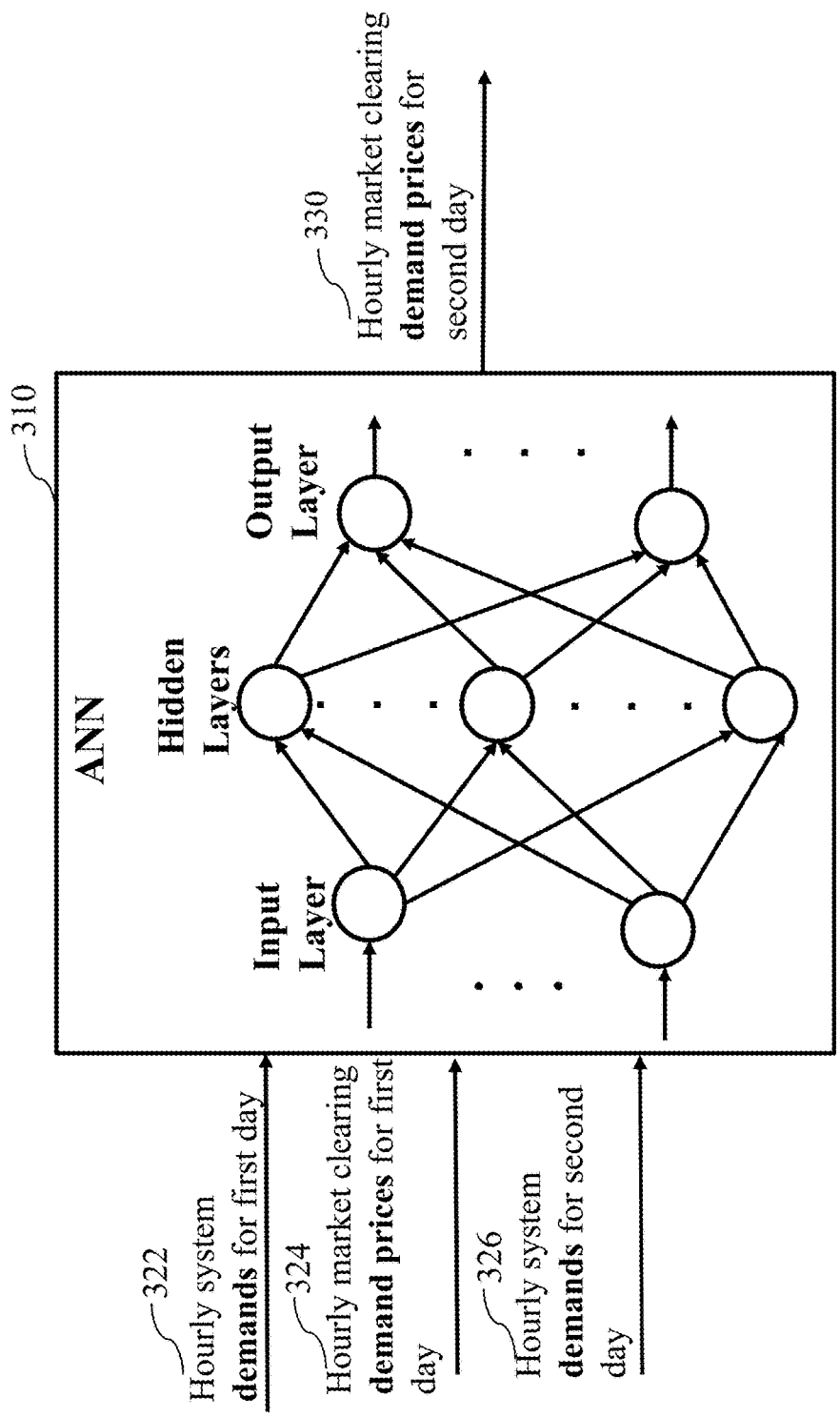
FIG. 3A is a schematic illustrating using an artificial neural network based machine learning method to predict market clearing demand prices, according to some embodiments of the present disclosure.

FIG. 3A is a schematic illustrating using an artificial neural network based machine learning method to predict market clearing demand prices, according to some embodiments of the present disclosure.

The prediction of hourly market clearing demand prices for the electric power system for the next day is implemented using a feed-forward neural network model, and the neural network is trained using a backpropagation algorithm. As shown in FIG. 3A, the neural network 310 is configured to take hourly system demands 322, market clearing demand prices 324 of a first day, and hourly system demands 326 for a second day as inputs, and hourly market clearing demand price 330 for a second day as outputs. The first day and second day can have different hour set. For example, if the market requires power producers submitting offer at 12 PM, the first day can be set to include 24 hourly time steps before 12 PM of that day. In comparison, the second day includes exactly all 24 hours belonging to the second day. The neural network is trained using a backpropagation algorithm with a set of historical data set for a period of days, wherein each data set includes a pair of a first day, and a second day, the data from the first day includes hourly cleared system demands, and hourly market clearing demand prices as inputs, and the date from the second day includes hourly cleared system demands as inputs, and hourly market clearing demand prices as outputs. The hourly market clearing demand prices for the electric power system for next day is determined by generating the outputs from the trained neural network by fed into hourly cleared system demands, hourly market clearing demand prices for the current day, and hourly forecasted system demands for the next day as inputs.

Figure 3B:
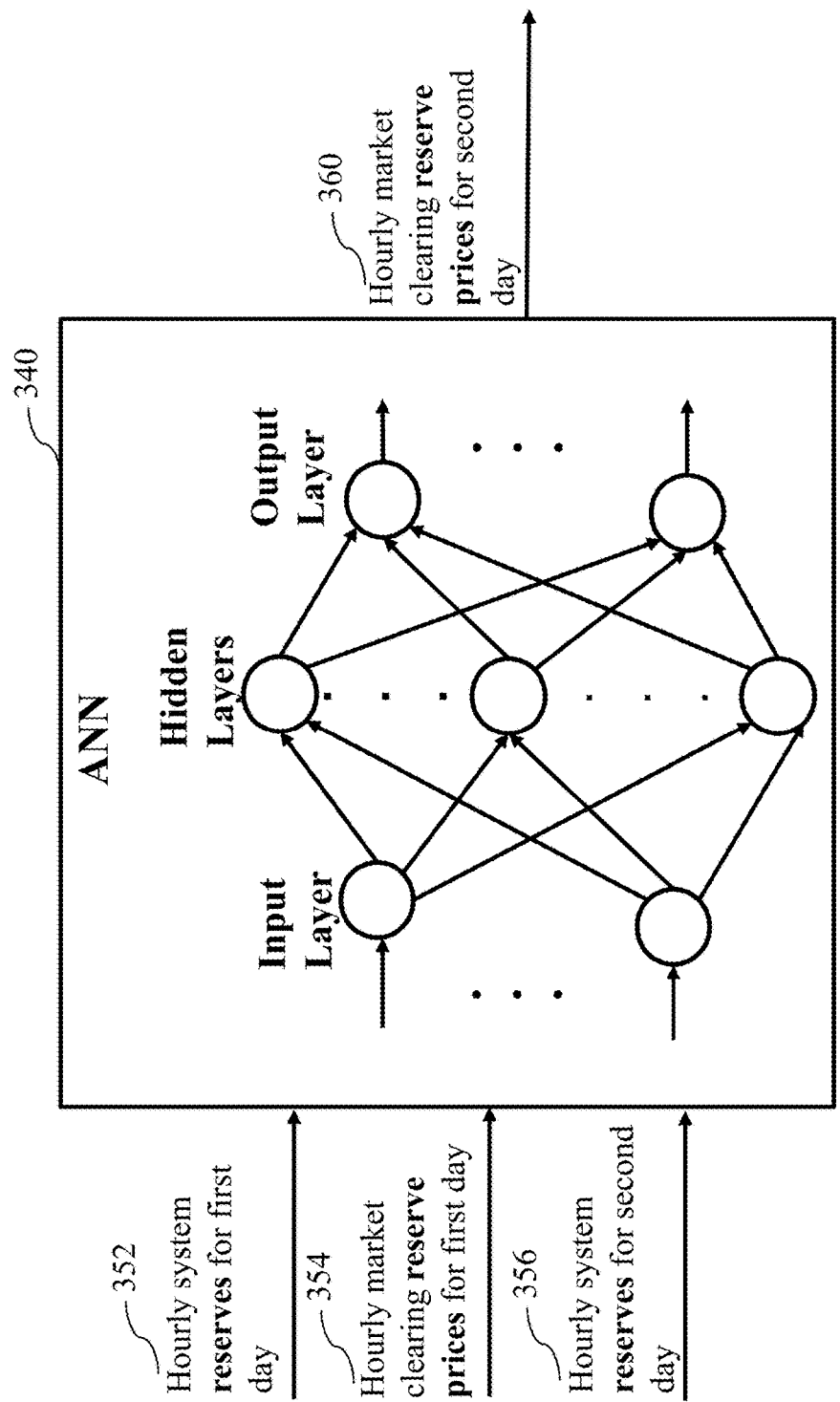
FIG. 3B is a schematic illustrating using an artificial neural network based machine learning method to predict market clearing reserve prices, according to some embodiments of the present disclosure.

FIG. 3B is a schematic illustrating using an artificial neural network based machine learning method to predict market clearing reserve prices, according to some embodiments of the present disclosure.

Similarly, the hourly market clearing reserve prices for the electric power system for the next day can be predicted by using a feed-forward neural network model configured as FIG. 3B. In FIG. 3B, the neural network 340 takes hourly cleared system reserve requirements 352, hourly market clearing reserve prices 354 for a first day, and hourly reserve requirement 356 for a second day as inputs, and hourly market clearing reserve price 360 for the second day as outputs. After trained the neural network using a backpropagation algorithm with a set of historical data set for a period of days, wherein each data set includes a pair of a first day, and a second day, the first day has hourly cleared system reserve requirements, hourly market clearing reserve prices as inputs, and the second day has hourly reserve requirement as inputs, and hourly market clearing reserve price as outputs, the hourly market clearing reserve prices for the electric power system for next day can be determined by generating outputs from the trained neural network by fed into hourly cleared system reserve requirements, hourly market clearing reserve prices for the current day, and hourly reserve requirement for the next day as inputs.

Figure 4A:
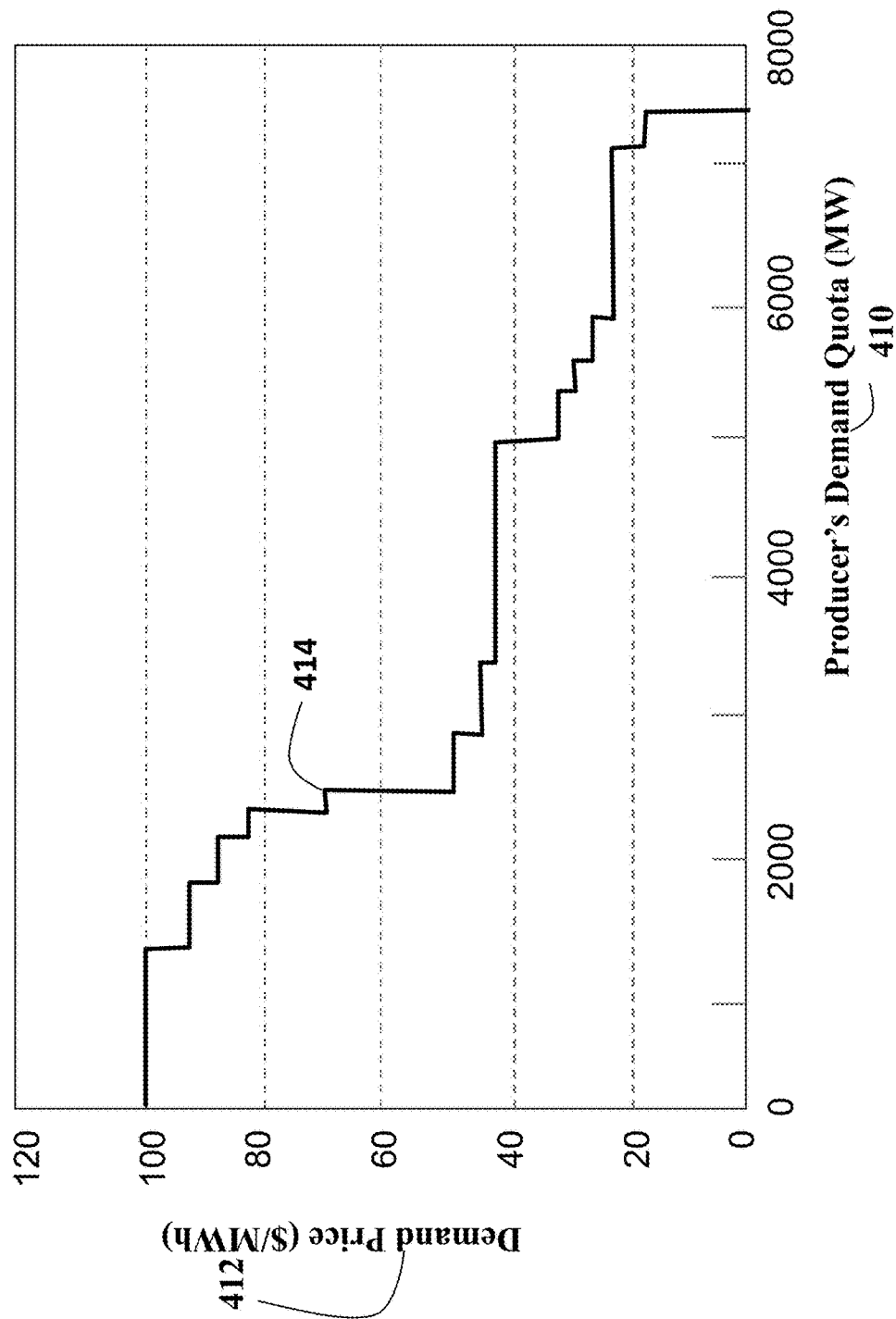
FIG. 4A a graph illustrating a residual demand curve for a power producer, according to some embodiments of the present disclosure.

FIG. 4A a graph illustrating a residual demand curve for a power producer, according to some embodiments of the present disclosure. FIG. 4A illustrates a typical residual demand curve for a power producer, in which the x-axis represents the producer's demand quotes 410 for generated power, and the y-axis represents the offered demand price 412. The curve may have multiple bid-points 414, and each point represents a pair of an offered demand quota and an offered demand price for the power producer. The curve can be step-wise as shown in FIG. 4A or piece-wise.

A residual demand curve at a given hour is obtained by subtracting the total combined competitors' demand supply offer curve from the total cleared demand for the electric power system. Note that the combined competitors' demand supply offers curve increases as the total offered demand quota increases. Similarly, a residual reserve curve at a given hour is generated by subtracting the total combined reserve supply offer curves from the total required reserve by the ISO.

Still referring to FIG. 4A, for a given ISO, its historical power producers' demand and reserve supply offer data, and its corresponding cleared system demand and reserve requirements are used to model/estimate the residual demand and reserve curves using a clustering based non-parametric approach.

It is noted that for an electricity market with less competitive power producers, it is best to use the previous day's supply offer curves to estimate corresponding day-ahead curves. Competitive power producers are defined as the ones who competitively update their day-ahead offers depending on the forecast of demand, reserve requirement, weather and competitors' behavior. However, in most of the electricity markets, daily supply offer data are available after certain period. For example, there is a few months' delay in electricity market, such as 4 months. Using competitors' supply offer curves from months ago results in low quality solutions. Therefore, the present disclosure can assume that the previous day's supply offer curve is not available.

If this assumption is not true and the previous day's curve is available but more competition exists between producers, the weighted sum of previous day's curves and the curves predicted by using the presently disclosed machine learning based method can be used as the final curves for determining the self-scheduling of the power producer.

Given these insights, the residual demand curves are estimated using a clustering based non-parametric approach.

Figure 4B:
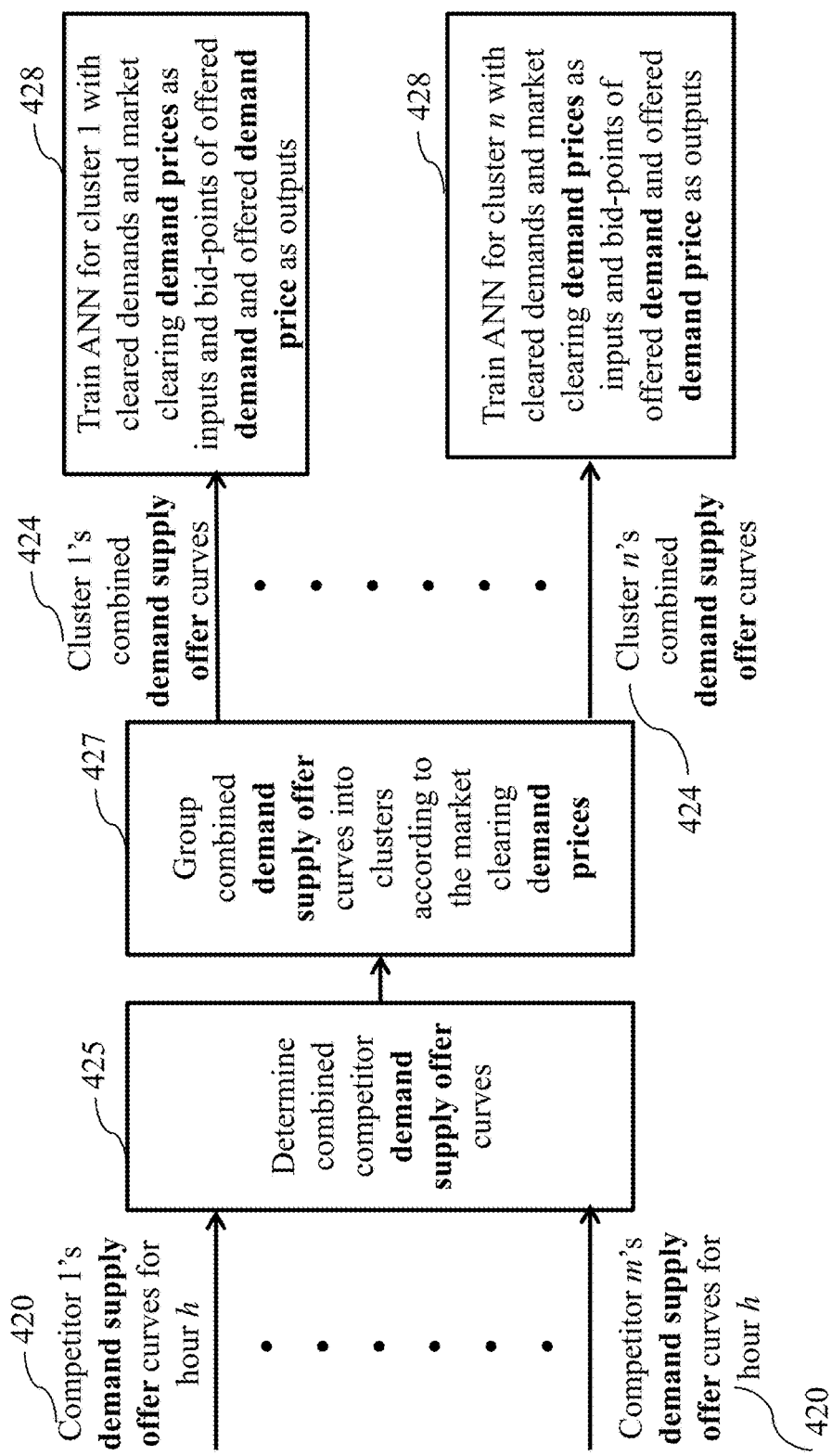
FIG. 4B is a block diagram illustrating some method steps for using artificial neural networks to map the combined competitor demand supply offer curves with market clearing demand prices and system cleared demands clustered by the ranges of market clearing demand prices, according to some embodiments of the present disclosure.
Figure 4C:
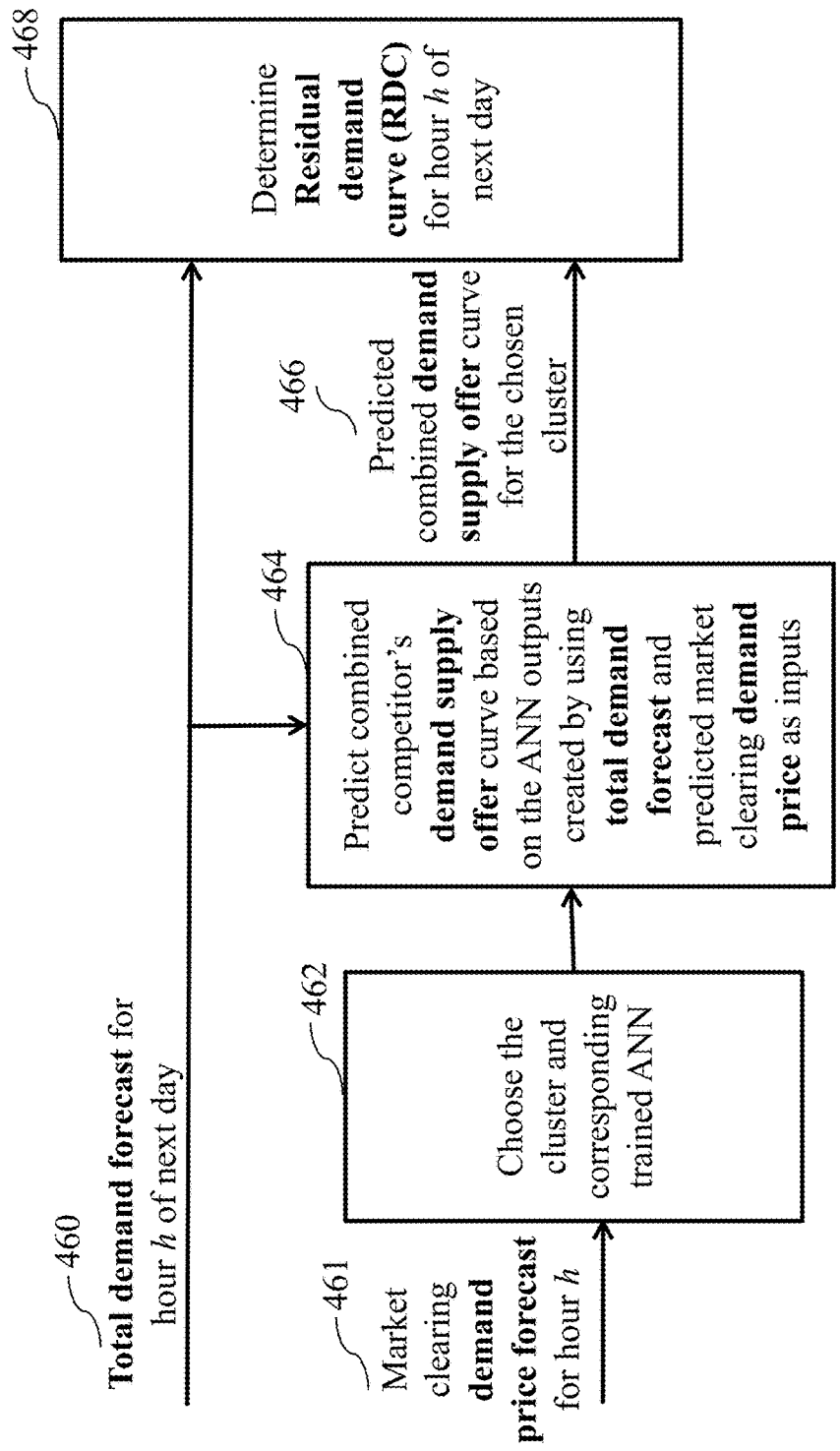
FIG. 4C is a block diagram illustrating some method steps for determining residual demand curve for the power producer, according to some embodiments of the present disclosure.
Figure 4D:
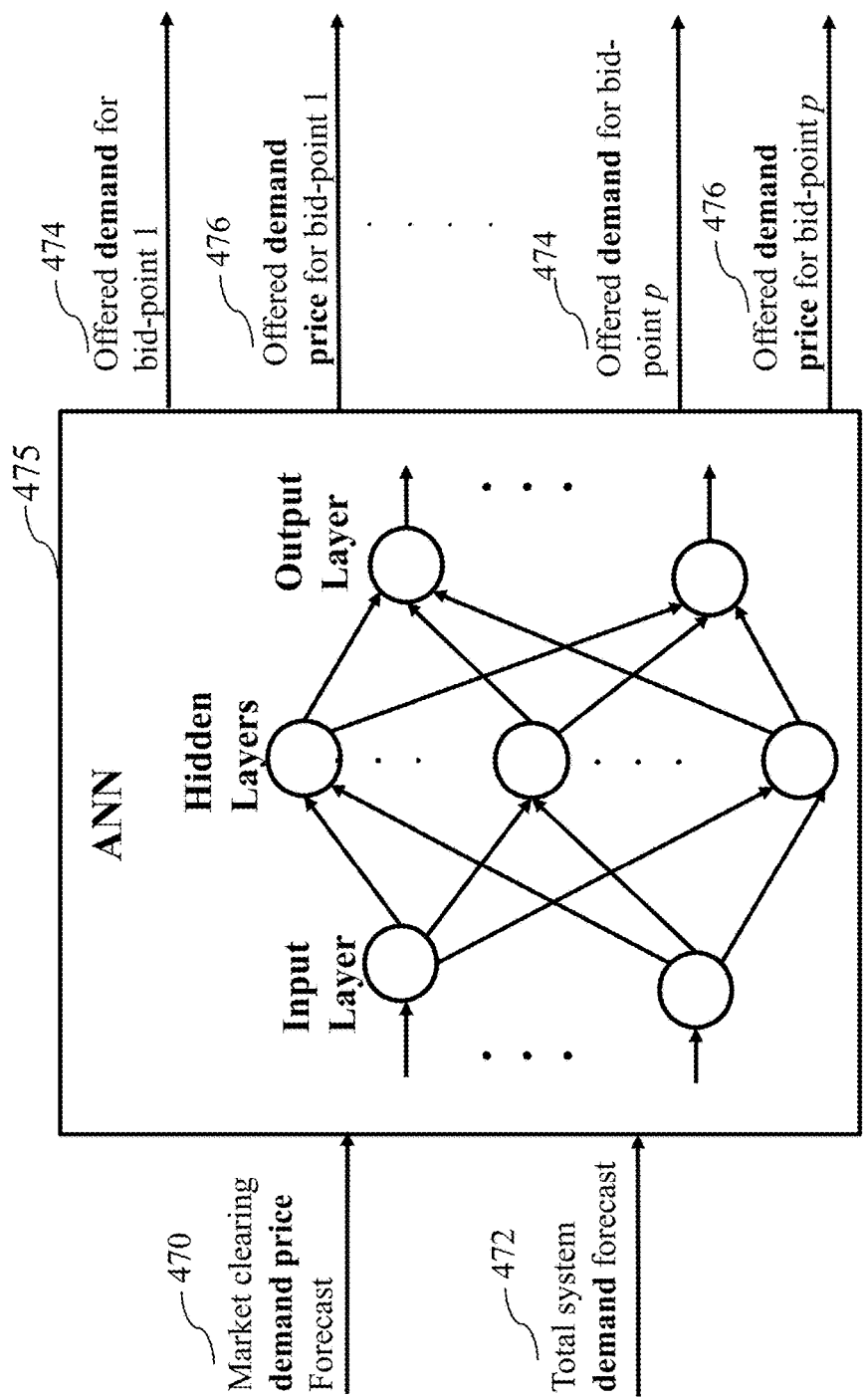
FIG. 4D is a schematic illustrating the input and output settings for the artificial neural network used for mapping the combined demand supply offer curve with market clearing demand price and system demand forecasts, according to some embodiments of the present disclosure.

The detailed steps for the estimation process are given in FIG. 4B, FIG. 4C and FIG. 4D.

FIG. 4B is a block diagram illustrating some method steps for using artificial neural networks to map the combined competitor demand supply offer curves with system cleared demands clustered by market clearing demand prices, according to some embodiments of the present disclosure. In FIG. 4B, there are m competitors in the market to compete with the said power producer for the required demanded energy for the ISO, and the combined competitor demand supply offer curves are divided into n clusters according to the ranges of market clearing demand prices.

As shown in FIG. 4B, the clustering based non-parametric approach first determines the combined competitors' demand supply offer curves, 425 for each hour over a long historical period (i.e. 6 months) by adding the individual power producer offers 420 for that hour together. The maximum limit of the combined demand supply offer curves are set to the day-ahead cleared total demand for the electric power system from the ISO. This means for a given demand supply offer curve, the maximum demand price is the market clearing demand price of the corresponding day. If necessary, the combined competitors' demand supply offer curves can be separated according to the seasons, or day types (such as weekdays, weekends and holidays), or weather conditions (such as hot days, and cold days).

The determined hourly combined competitors' demand supply offer curves for each hour are then grouped into a set of clusters, 427 using a k-means algorithm according to the corresponding market clearing demand price. Each cluster represents a different range of market clearing demand prices. The k-means clustering aims to partition total observations into a few clusters in which each observation belongs to the cluster with the nearest mean, serving as a prototype of the cluster.

After the clusters are generated, an artificial neural network is used for each cluster, 428 to train a model that maps historical combined demand supply offers, 424 with the corresponding historical market clearing demand prices for the cluster and historical total system demand.

FIG. 4C is a block diagram illustrating some method steps for determining residual demand curve for the day-ahead scheduling for the power producer, when the artificial neural networks trained using steps in FIG. 4B are available, according to some embodiments of the present disclosure.

As shown in FIG. 4C, a cluster is first chosen, 462 using the estimated market clearing demand price for next day at the said hour, 461. The trained artificial neural network for the chosen cluster is then used, 464 to estimate the combined demand supply offer curve based on the day-ahead demand forecast and the estimated market clearing demand price. After that, the residual demand curve is determined, 468 by subtracting the estimated combined competitors' demand supply offer curve, 466 from the day-ahead total demand forecast (available from the ISO), 460.

FIG. 4D is a schematic illustrating the input and output settings for the artificial neural network used for mapping the combined demand supply offer curve with market clearing demand price and system demand forecasts, according to some embodiments of the present disclosure. In FIG. 4D, there are p bid-points used to describe the combined demand supply offer curve.

The artificial neural network 475 for each hour and a given cluster takes market clearing demand price 470, and total system demand 472 as inputs, and the offered demand quotas 474 and demand prices 476 for all bid-points as outputs. The neural network is trained using historical data of demand supply offer curves, cleared system demands and market clearing demand prices. However, when the neural network is used for predicting the combined demand offer curve for next day, the system demand forecast and the estimated market clearing demand price for next day are used as its inputs.

The residual reserve curves are determined using the same approach as for determining the residual demand curves. The detailed steps for the estimation process are shown in FIG. 5A, FIG. 5B and FIG. 5C.

Figure 5A:
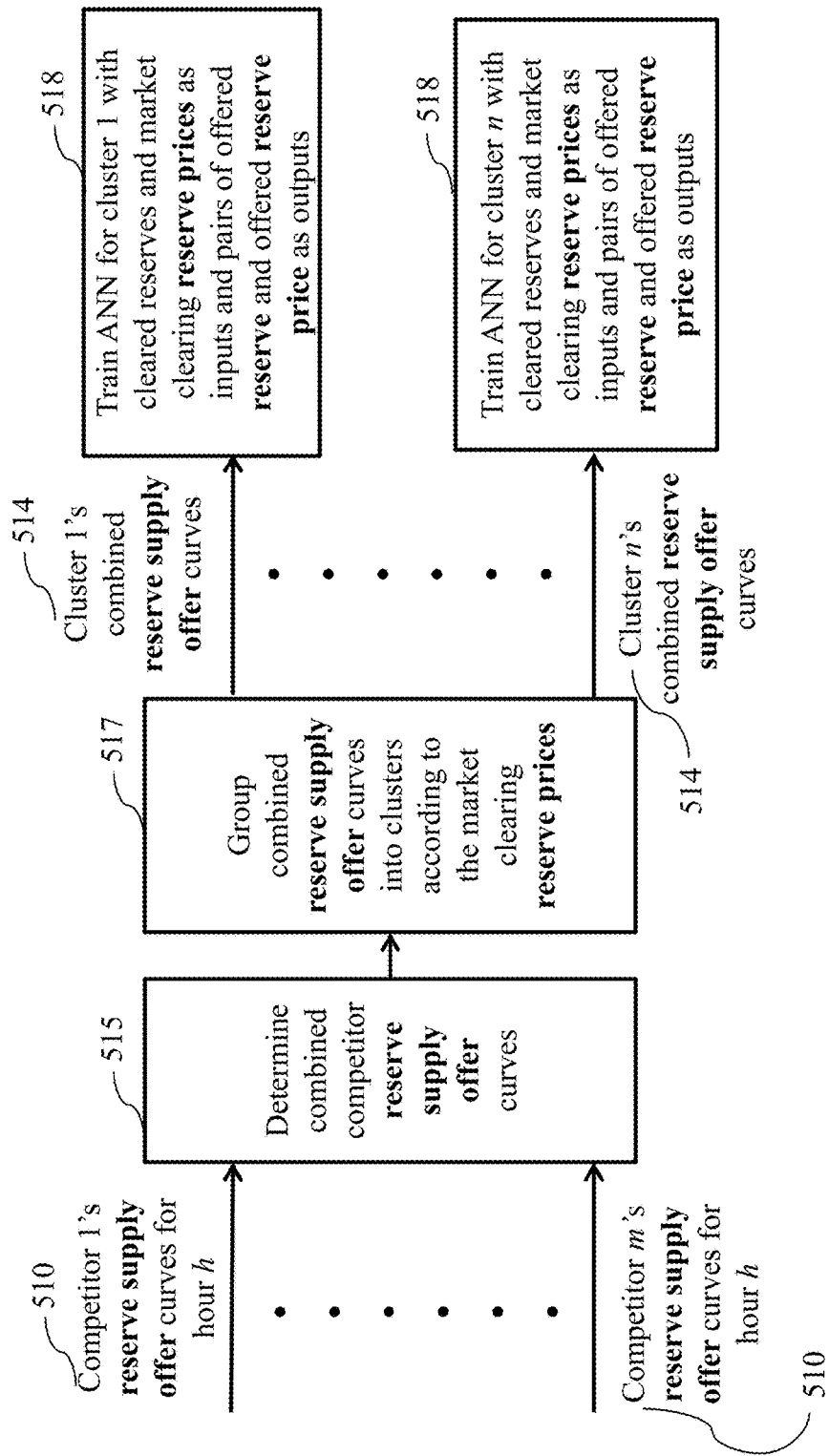
FIG. 5A is a block diagram illustrating some method steps for using artificial neural networks to map the combined competitor reserve supply offer curves with market clearing reserve prices and system reserve requirement clustered by the ranges of market clearing reserve prices, according to some embodiments of the present disclosure.
Figure 5B:
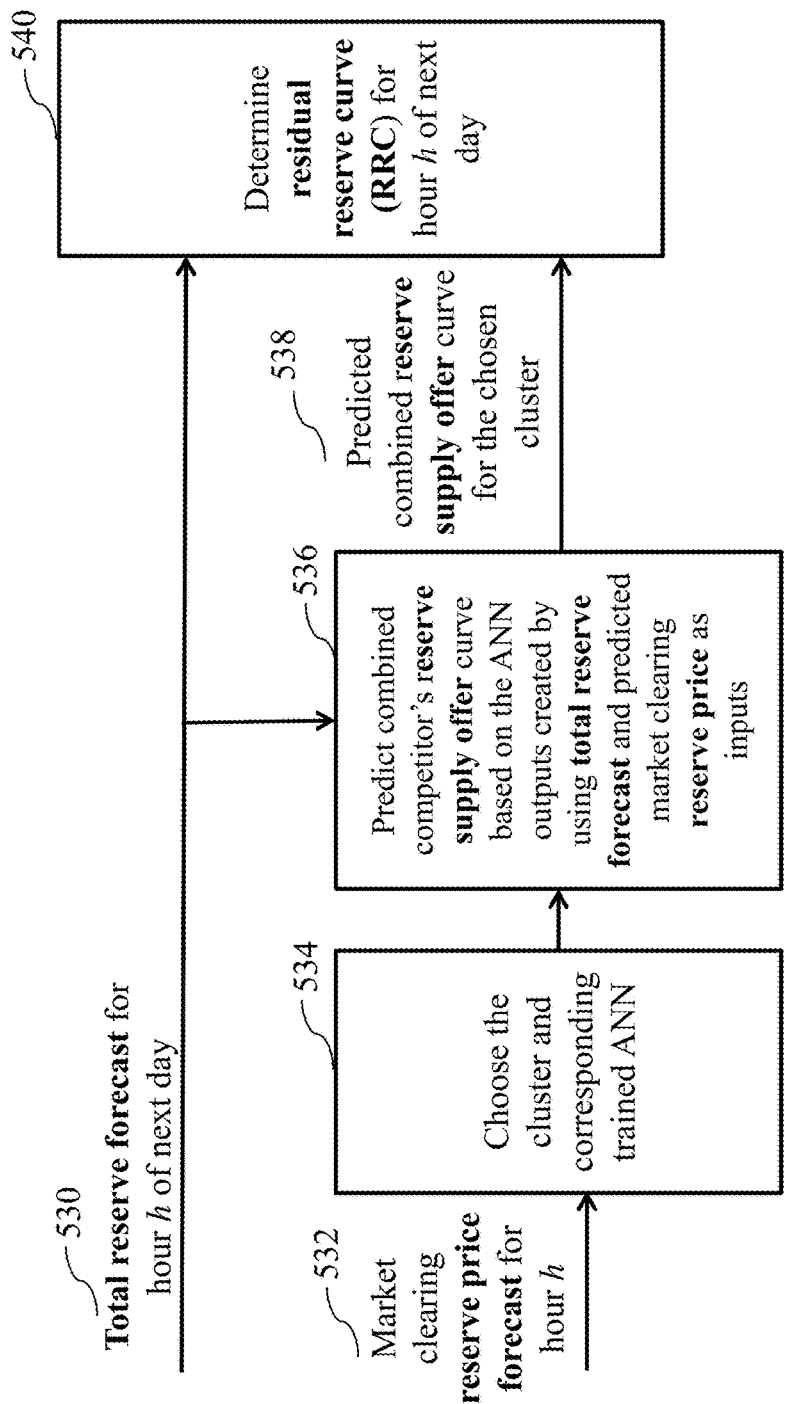
FIG. 5B is a block diagram illustrating some method steps for determining a residual reserve curve for the power producer, according to some embodiments of the present disclosure.
Figure 5C:
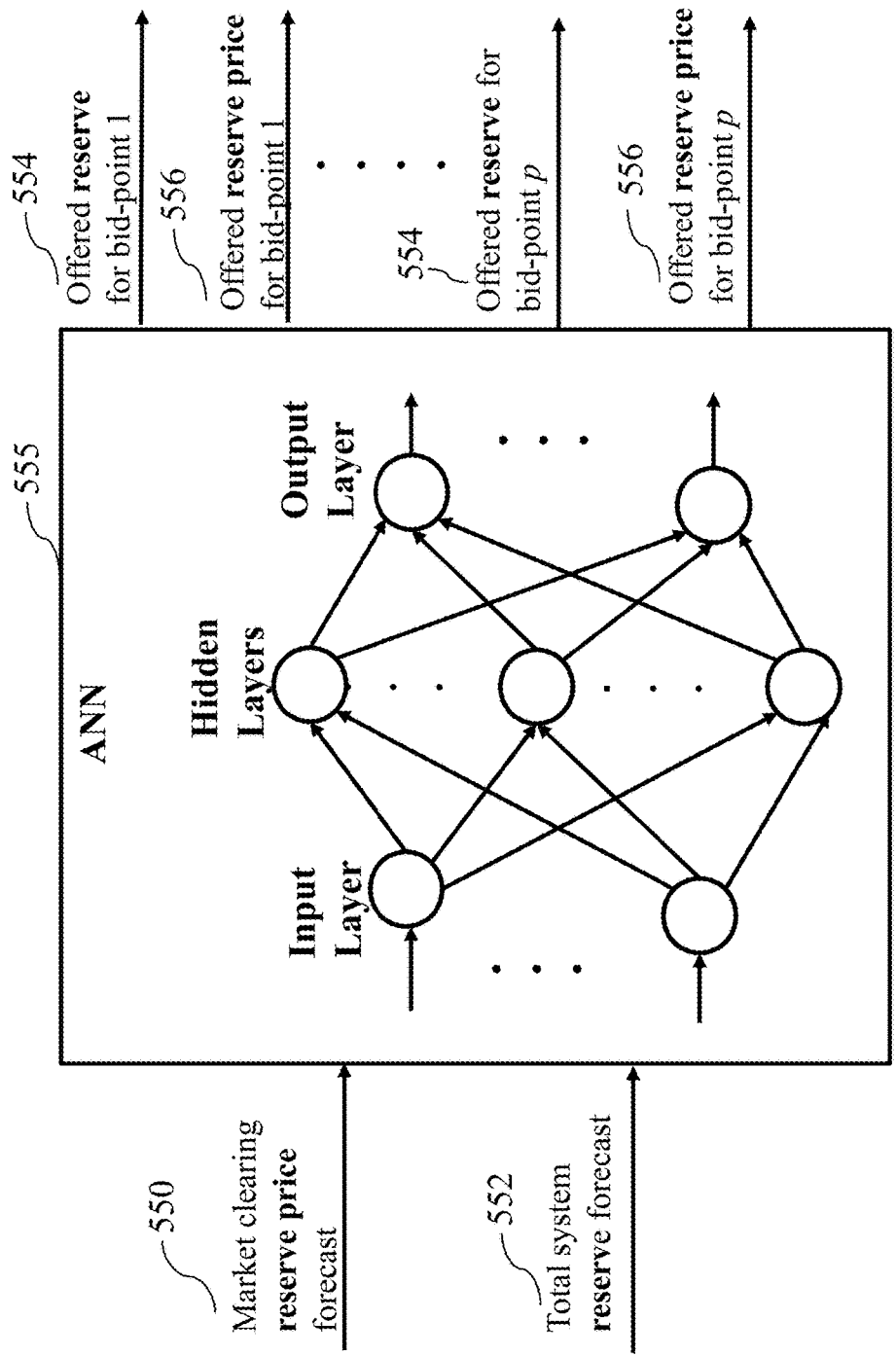
FIG. 5C is a schematic illustrating the input and output settings for the artificial neural network used for mapping the combined reserve supply offer curve with market clearing reserve price and system reserve forecasts, according to some embodiments of the present disclosure.

FIG. 5A is a block diagram illustrating some method steps for using neural networks to map the combined competitor reserve supply curves with system reserve requirement clustered by market clearing reserve prices, according to some embodiments of the present disclosure. There are m competitors in the market to compete with the power producer for producing the required reserves for the ISO, and the combined competitor reserve supply offer curves are divided into n clusters according to the ranges of market clearing reserve prices.

As shown in FIG. 5A, the combined competitors' reserve supply offer curves are firstly determined, 515 for each hour over the pre-determined historical period by adding the individual power producer offers 510 for that hour together. The maximum limit of the combined reserve supply offer curves are set to the day-ahead cleared total reserve requirement for the electric power system from the ISO, and therefore the maximum reserve price is the market clearing reserve price of the corresponding day for a given reserve supply offer curve. If necessary, the combined competitors' reserve offer curves can also be separated according to the season, day type, or weather type.

The determined hourly combined competitors' reserve supply offer curves for each hour are then grouped into a set of clusters, 517 using the k-means algorithm according to the corresponding market clearing reserve price. Each cluster represents a different range of market clearing reserve prices.

After the clusters are generated, the artificial neural network is used for each cluster, 518 to train a model that maps historical combined reserve supply offer curves, 514 with the corresponding historical market clearing reserve prices for the cluster and historical total system reserve requirement.

FIG. 5B is a block diagram illustrating some method steps for determining residual reserve curve for the day-ahead scheduling for the power producer, when the artificial neural networks trained using steps in FIG. 5A are available, according to some embodiments of the present disclosure.

As shown in FIG. 5B, a cluster is first chosen, 534 using the estimated market clearing reserve price for next day at the said hour, 532. The trained artificial neural network for the chosen cluster is then used, 536 to estimate the combined reserve supply offer curve based on the day-ahead reserve requirement forecast and the estimated market clearing reserve price. After that, the residual reserve curve is determined, 540 by subtracting the estimated combined competitors' reserve supply offer curve, 538 from the day-ahead total reserve forecast received from the ISO, 530.

FIG. 5C is a schematic illustrating the input and output settings for the neural network used for mapping the combined reserve supply offer curve with market clearing reserve price and system reserve forecasts, according to some embodiments of the present disclosure. In FIG. 5C, there are p bid-points used to describe the combined reserve supply offer curve.

The artificial neural network 555 for each hour and a given cluster takes market clearing reserve price, and total system reserve as inputs, and the offered reserve quotas and reserve prices for all bid-points as outputs. The neural network is trained using historical data of reserve supply offer curves, cleared system reserves and market clearing reserve prices. However, when the neural network is used for predicting the combined reserve offer curve for next day, its inputs are replaced with the system reserve forecast and the estimated market clearing reserve price for next day.

It is noted that weather information may be used as inputs of neural networks if those data are available and strongly correlated with energy production, particularly when the weather-depended renewable generators, such as solar panels, wind farms and hydro plants are used. The weather data may include ambient temperature, wind speed and rainfall levels.

The residual demand and reserve curves generated from the clustering based an approach that can be used to solve the power producer's self-scheduling problem along with machine learning based state-space approximate dynamic programming technique.

Machine Learning Based State-Space Approximation

The power producer's self-scheduling problem can be formulated as a stochastic optimization problem over a daily decision horizon. The horizon is a 24-hour period that can be divided into 24 time-steps with an hourly resolution. Here one hour is chosen as example for the length of decision time step. Other time step with different length can also be used such as 30 minutes, 15 minutes, and 5 minutes.

A machine learning based state-space approximate dynamic programming method is used to solve the power producer's self-scheduling problem. The approach integrates state-space approximation strategies into the procedure of dynamic programming. For a self-scheduling problem, the goal is to find an optimal state combination for the demand-reserve quotas and generator statuses that can achieve benefit maximum through selling energy and reserve service to the ISO. It is obvious that looping over all the states in this three-dimensional state-space is computationally difficult. In order to overcome this computational burden, the machine learning is used to make approximations to the state-space. The aim is to only loop over the required or desired states so the solution quality stays the same.

Figure 6:
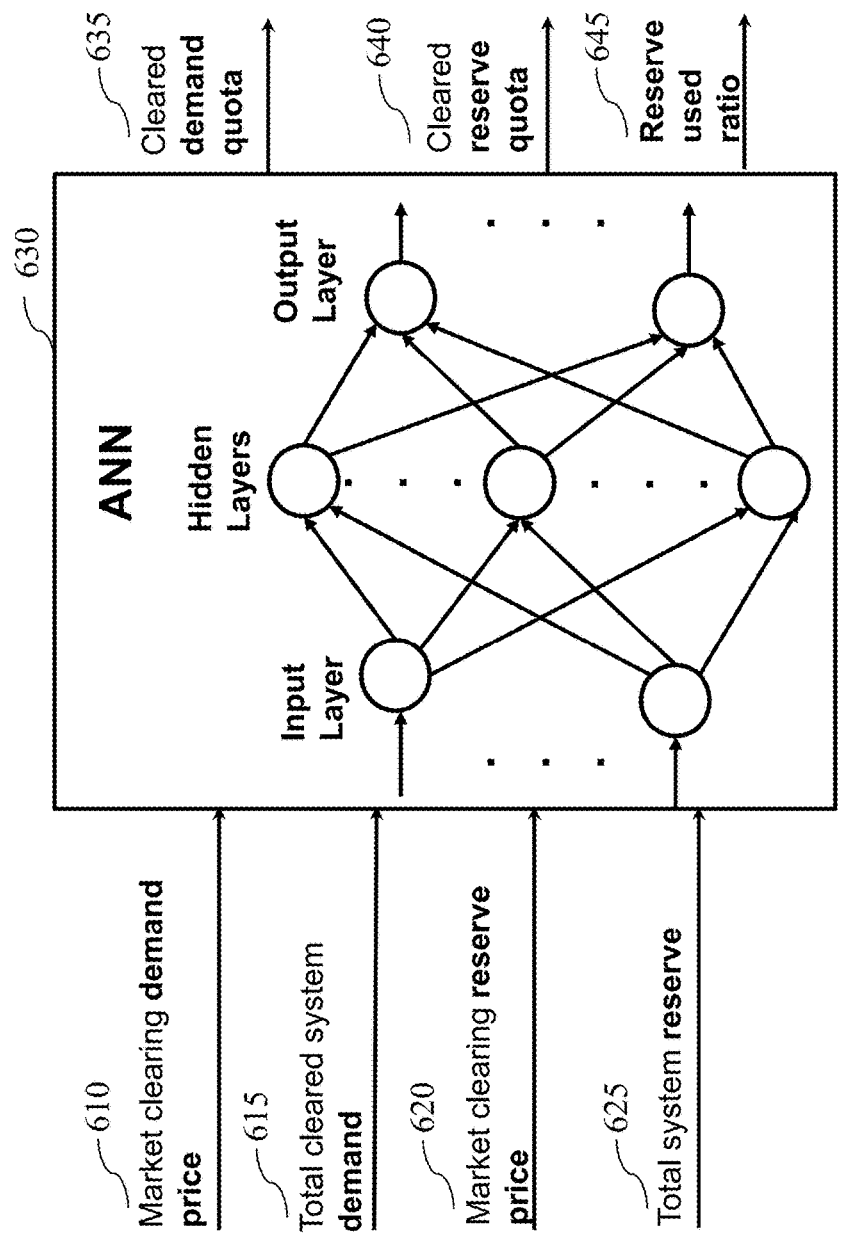
FIG. 6 is a schematic illustrating the input and output settings for using artificial neural network to estimate the possible cleared demand and reserve quotas, and the reserve used ratio for the power producer based on market clearing demand and reserve prices, and system demand and reserve forecasts, according to some embodiments of the present disclosure.

FIG. 6 is a schematic illustrating the input and output settings for using neural network to estimate the cleared demand and reserve quotas for the power producer based on the estimated market clearing demand and reserve prices, and the system demand and reserve forecasts, according to some embodiments of the present disclosure.

The present disclosure provides that the demand and reserve quota states for a given hour are approximating through two-step procedure. First we train a non-parametric model, 630 using ANN to map the market clearing demand price 610, cleared system demand 615, market clearing reserve price 620, and the reserve requirement by the ISO 625 (inputs) for the given hour, with power producer's demand quota 635, reserve quota 640, and reserve used ratio 645 (outputs) for the given hour, as shown in FIG. 6. Then, the trained non-parametric model is used to obtain cleared day-ahead demand and reserve quota estimates for the given hour using estimated market clearing demand and reserve prices, and demand and reserve requirement forecasts for the given hour. The estimated cleared demand and reserve quota states are then used to identify the interested state space of the self-scheduling problem, where we can have a finer discretization. The range of the interested region is found from experimentation and needs to be larger if the estimations from the machine learning have a high error. The market clearing demand and reserve prices can also be replaced with the corresponding market clearing demand and reserve prices before the power producer's demand and reserve quotas if those data are available.

It is noted that weather information may be also used as inputs of neural networks as shown in FIG. 6.

Formulation of Self-Scheduling and Backward and Forward Solution Strategy

The aim of the self-scheduling problem for a power producer is to determine the energy production schedule for a given set of generators over a given decision horizon. The schedule should satisfy both the needs from the demanded energy and the needs from the reserved energy. The decision horizon may include a set of time steps. Let g and k denoting a particular generator, and a particular time step, G and K the total number of generators, and the total number of time steps.

The state variables for the power producer includes the market clearing demand price $s_k^{\lambda,e}$, market clearing reserve price $s_k^{\lambda,r}$, forward bilateral contract price $s_k^{\lambda,f}$, total reserve quota $s_k^{q,r}$, forward bilateral contract power $s_k^{q,f}$, and total demand quota $s_k^{q,e}$ (not included forward contract power). The market clearing demand price and the power producer's demand quota are presented in the form of residual demand curves, and the market clearing reserve price is presented as a function of the reserve quota through residual reserve curves. The market clearing reserve price $s_k^{\lambda,r}$ consists of a regulation capacity offer price $s_k^{\lambda,r,cap}$ and a regulation service offer price $s_k^{\lambda,r,ser}$.

The state variables for the generator includes the on/off status $s_k^{g,s}$, power generated at the current time-step $s_k^{g,p}$, start command $s_k^{g,u}$, shut down command $s_k^{g,d}$, remaining de-committed time $s_k^{g,t^d}$, remaining committed time $s_k^{g,t^c}$. Those state variables are used to describe decisions for power generation, and to compute related costs, rewards and transitions.

The constraints for the problem include the maximum and minimum capacity limits, connected transmission line capacity limits, minimum committed and de-committed times, ramp up and down rate constraints introduced by the generators of the power producer, and power balance and maximum generation requirements introduced by the demand and energy quotas of the power producer. The generator related constraints depend on the type of generator used by the power producer. Different type of generators, such thermal, hydro, wind and solar may demonstrate different operation patterns and requirements. Taken a thermal generator as example, it may include several different phases when it is in committed status, and different constraints on the operation of generator may be used.

Figure 7:
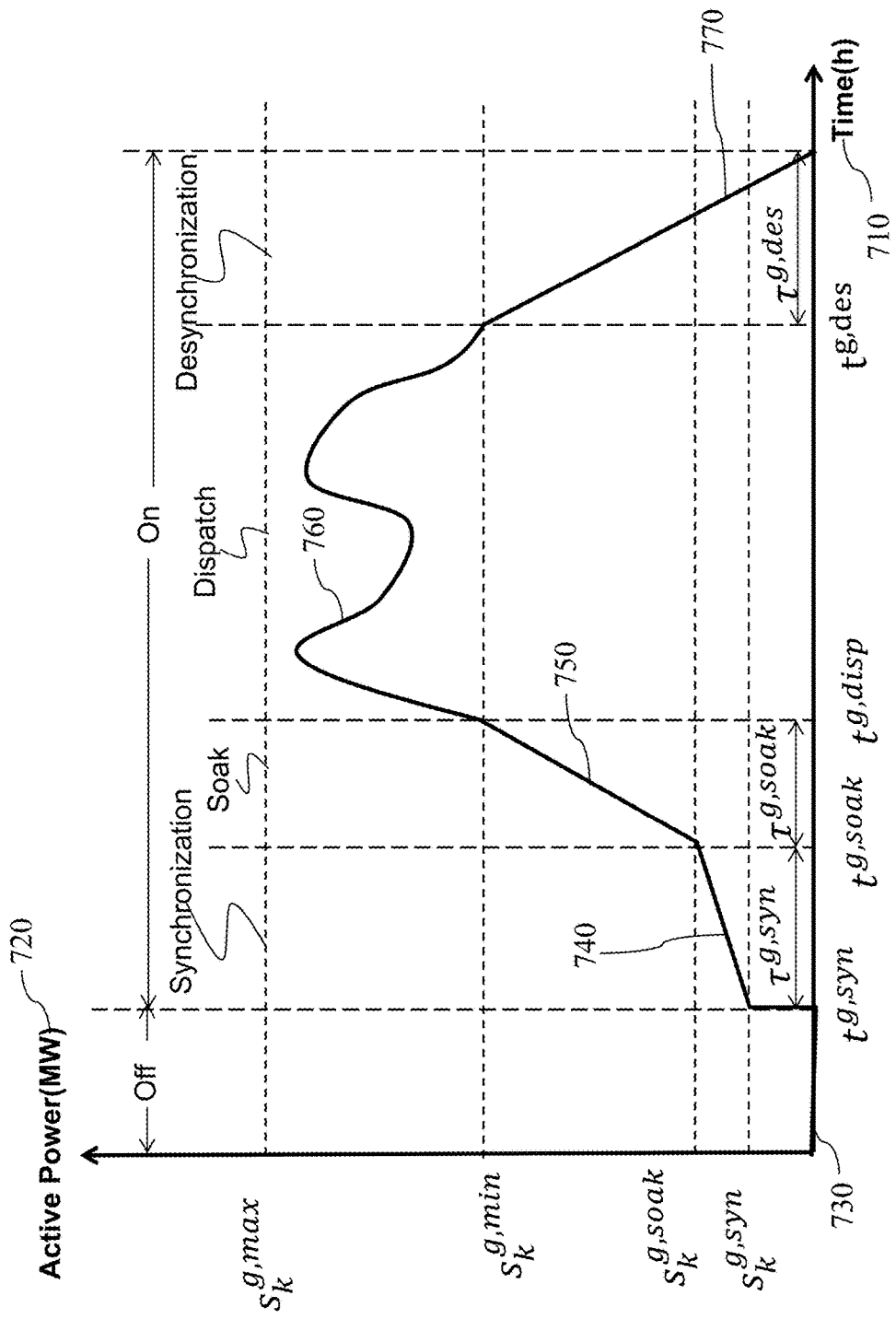
FIG. 7 is a graph illustrating the operating states of a thermal generator, according to some embodiments of the present disclosure.

FIG. 7 is a graph illustrating the operating states of a thermal generator, according to some embodiments of the present disclosure. The x axis, 710 represents the time in hours, and the y axis, 720 represents the generated power from the generator.

As shown in FIG. 7, the thermal generator may have five different statuses. It includes one de-committed status 730, and four consecutive operation statuses when committed, including synchronization phase 740, soak phase 750, dispatchable phase 760, and desynchronization phase 770. The time that takes for the synchronization, soak and desynchronization phases are given by $\tau^{g,syn}$, $\tau^{g,soak}$, $\tau^{g,des}$, respectively.

Still referring to FIG. 7, the power generated at instantaneous time t during the synchronization phase increases linearly from synchronization generation limit $s_k^{g,syn}$ to the soak power generation limit power $s_k^{g,soak}$:

$$s_k^{g,p}(t) = s_k^{g,syn} + \frac{s_k^{g,soak} - s_k^{g,syn}}{\tau^{g,syn}}(t - t^{g,syn}), \quad (1a)$$

where $t^{g,syn}$ is the beginning time for the synchronization phase. Meanwhile the power generated at instantaneous time t increases linearly from soak power generation limit $s_k^{g,soak}$ to minimum power limit $s_k^{g,min}$ during the soak phase:

$$s_k^{g,p}(t) = s_k^{g,soak} + \frac{s_k^{g,min} - s_k^{g,soak}}{\tau^{g,soak}}(t - t^{g,soak}), \quad (1b)$$

where $t^{g,soak}$ is the beginning time for the soak phase. In addition, the power generated at instantaneous time t decreases linearly from minimum power limit $s_k^{g,min}$ to zero during the desynchronization phase:

$$s_k^{g,p}(t) = s_k^{g,min} - \frac{s_k^{g,min}}{\tau^{g,des}}(t - t^{g,des}), \quad (1c)$$

where $t^{g,des}$ is the beginning time for the desynchronization phase.

The generator may serve for satisfying system reserve requirement only when it is dispatchable. During the dispatchable phase, the power generated can range between the minimum power generation limit $s_k^{g,min}$ and maximum power generation limit $s_k^{g,max}$:

$$s_k^{g,min} \leq s_k^{g,p} \leq s_k^{g,max}, \quad (1d)$$

according to the ramp up rate $r_{g,u}$ and ramp down rate $r_{g,d}$:

$$-r^{g,d} \leq s_{k+1}^{g,p} - s_k^{g,p} \leq r^{g,u}, \quad (2)$$

Generators can only be turned on (i.e. $s_k^{g,u} = \max\{s_{k+1}^{g,s} - s_k^{g,s}, 0\} = 1$) when the minimum de-committed time $\tau^{g,d}$ is satisfied:

$$s_k^{g,u}(s_k^{g,t^d} - \tau^{g,d}) \geq 0, \quad (3a)$$

Where $s_k^{g,t^d}$ represents the generator remaining de-committed time at the time step k.

Generator can only be turned off (i.e. $s_k^{g,d} = \max\{s_k^{g,s} - s_{k+1}^{g,s}, 0\} = 1$) when the minimum committed time $\tau^{g,u}$ is satisfied:

$$s_k^{g,d}(s_k^{g,t^u} - \tau^{g,u}) \geq 0, \quad (3b)$$

where $s_k^{g,t^u}$ represents the generator remaining committed time at the time step k.

The total power generated from all the generators have to be equal to the power producer's demand quota, forward contract power and the reserve used $\tilde{s}_k^{q,r}$ (determined as a product of reserve capacity $s_k^{q,r}$, and reserve used ratio determined in FIG. 6):

$$\Sigma_{g=1}^{G} s_k^{g,p} = s_k^{q,e} + s_k^{q,f} + \tilde{s}_k^{q,r}. \quad (4)$$

where $0 \leq \tilde{s}_k^{q,r} \leq s_k^{q,r}$.

The reserve quota has to be met at all time-steps according to:

$$\Sigma_{g=1}^{G} \tilde{s}_k^{g,p} \geq s_k^{q,e} + s_k^{q,r} + s_k^{q,f}, \quad (5)$$

where $\tilde{s}_k^{g,p}$ is the maximum possible generation considering the ramp rates and the maximum power generation limit.

The power generated is transmitted to the electric power systems through transmission lines connected to the power producers. Multiple transmission lines may be used, and the producer also may share transmission lines with other producers or consumers. The maximum generation for the producer is limited by the allocated capacities of the transmission lines connected with the producer:

$$\Sigma_{g=1}^{G} \beta_{l,g} \tilde{s}_k^{g,p} \leq \alpha_{l,k} F_l^{max}, \quad (6)$$

where $F_l^{max}$ is the power capacity of a transmission line l that connected with the power producer. $\alpha_{l,k}$ is the allocation ratio for its capacity that can be used by the producer. $\beta_{l,g}$ is the contribution factor of generator g to the transmission line l, and $\beta_{l,g}$ is set to be 1 if generator g is connected with line l, otherwise set to be zero.

For each time step k, we can have a set of states, $s_k$, and each $s_k$ consists of a set of generator states $s_k^1$ and a set of producer states $s_k^2$ $$s_k^1 = [sg_k^1 \ldots sg_k^g \ldots sg_k^G]^T, \quad (7a)$$

$$s_k^2 = [s_k^{q,e} s_k^{\lambda,e} s_k^{q,r} s_k^{\lambda,r} s_k^{q,f} s_k^{\lambda,f}], \quad (7b)$$

where $sg_k^g = [s_k^{g,p} s_k^{g,s} s_k^{g,u} s_k^{g,d} s_k^{g,t^u} s_k^{g,t^d}]$, $sg_k^g$ is the set of states for generator g.

Equations (2) and (3) are the intertemporal constraints, so they are used to constrain the transition between the states for a generator at two consecutive time steps when solving the self-scheduling problem using dynamic programming. Based on equations (2), and (3), the transition function $sg_{k+1}^g = s^M(sg_k^g)$ is defined to describe the evolution of a state of the generator g from k to k+1, and $s^M(\bullet)$ is the system model that consists of generators' operational constraints such as power generation limits, minimum committed and de-committed times, ramp rates, and power balance.

The objective function of the self-scheduling problem is given by:

$$F^{\pi^*} = \max_{\pi^*} \mathbb{E}\left\{\sum_{k=1}^{K} C_k(s_k, \pi(s_k))\right\}, \quad (8)$$

where $\pi^*$ is the optimal policy, a choice of action for each state $\pi$: S→A that maximizes the expected sum of future benefits over the decision horizon, $\pi(s_k)$ is an action from state $s_k$, S and A are the state and action spaces, and $C_k(s_k, \pi(s_k))$ is the contribution at a given time-step k, which is given by:

$$C_k(s_k, \pi(s_k)) = s_{k+1}^{\lambda,e} s_{k+1}^{q,e} + s_{k+1}^{\lambda,r,cap} s_{k+1}^{q,r,cap} + \tilde{s}_{k+1}^{q,r} s_{k+1}^{cur} s_{k+1}^{q,r,ser} + s_{k+1}^{\lambda,f} s_{k+1}^{q,f} - \Sigma_{g=1}^{G} [c^{fuel}(s_{k+1}^{g,p}) + c^{fixed}(s_{k+1}^{g,s}) + s_{k+1}^{g,u} c^{start}(s_{k+1}^{g,t^d}) + s_{k+1}^{g,d} c^{shut}(s_{k+1}^{g,t^u})] \quad (9)$$

where $s_{k+1}$ is the state at time step (k+1) resulted by following action $\pi(s_k)$. $s_k^{cur}$ is the capacity utilization ratio for reserve at time step k, and defined as the service offer time divided by 60 minutes. When the time-step is one hour, $s_k^{cur} = 1$. $c^{fuel}(\bullet)$ is the fuel cost that can be expressed as a linear or non-linear function of generator power generation level $s_k^{g,p}$, $c^{fixed}(\bullet)$ is a fixed cost related to generator status $s_k^{g,s}$, $c^{start}(\bullet)$ is the starting cost defined as a non-linear function of remaining de-committed time $s_k^{g,t^d}$, $c^{shut}(\bullet)$ is the shutting-down cost defined as a non-linear function of remaining committed time $s_k^{g,t^u}$.

The contribution function $C_k(s_k, \pi(s_k))$ is calculated by subtracting the cost of generation from the revenue from selling power. The generation cost includes operating costs, fixed costs and start and shut down costs. The power producer's self-scheduling problem is formulated as an optimization of the expected contribution because the contribution is generally a random variable due to the effect of stochastic electricity prices, power producer's quota and required reserve.

As formulated above, the self-scheduling problem can be treated as a dynamic programming problem with three-dimensional state space on producer's demand quota, producer's reserve quota and generator status combination. Among the power producer states, its forward contract power and price are given, and its market clearing demand price and market clearing reserve price are functions of producer demand quota and reserve quota if corresponding residual demand curve and residual reserve curve are given, so only producer demand quota and reserve quota are treated as independent states to be solved. Regarding the generator's states, the start and shut-down commands and remaining committed and de-committed times can be determined if generator statuses at corresponding time-step or consecutive time steps are given. For a committed generator operated at non-dispatchable phases, its power generated is solely determined based on its corresponding on/off statuses. The power generated for generators at dispatchable phase can also be determined by simply solving an operational cost minimization problem with power balance and power generation limits when the producer's demand quota and reserve quota, generator statuses, and initial/terminal states are given. Therefore, only the generator on/off status combination needs to be treated as independent state variable among all generator related states.

The problem in (8) can be cast as a Markov decision process (MDP) due to the separable objective function and Markov property of the transition functions. Given this, dynamic programming solves the MDP form of (8) by computing a value function $V^\pi(s_k)$.

The value function is defined as the expected future benefit of following a policy, $\pi$, starting in state, $s_k$, and given by:

$$V^\pi(s_k) = \sum_{s' \in S} \mathbb{P}(s'|s_k, \pi(s_k))[C_k(s_k, \pi(s_k), s') + V^\pi(s')] \quad (10a)$$

where $\mathbb{P}(s'|s_k, \pi(s_k))$ is the transition probability. When the probability data is not available, or difficult to obtain, the expected value can be replaced with the maximum value, that is the right side of (10a) is replaced with the maximal value of $C_k(s_k, \pi(s_k), s') + V^\pi(s')$ over $s' \in S$:

$$V^\pi(s_k) = \max_{s' \in S}[C_k(s_k, \pi(s_k), s') + V^\pi(s')] \quad (10b)$$

An optimal policy, $\pi^*$ is one that maximizes (8), and which also satisfies Bellman's optimality condition:

$$V_k^{\pi^*}(s_k) = \max_{\pi^*}(C_k(s_k, \pi(s_k)) + \mathbb{E}\{V_{k+1}^{\pi^*}(s') | s_k\}) \quad (11)$$

The expression in (11) is typically computed using backward induction, a procedure called value iteration, and then an optimal policy is extracted from the value function by selecting a maximum value action for each state. This backward iteration strategy is usually used when the states at the end of decision horizon are known. The forward iteration strategy is used instead if the states before the decision horizon are known. In the present disclosure, the computational performance of dynamic programming is improved by making approximations to the state and action spaces.

Using the backward iteration strategy, the state-space approximate dynamic programming method can be described as Algorithm-1:

Algorithm 1:

1: Load residual demand curve and residual reserve curve.
2: Approximate end-of-day states.
3: Initialize $V_k(s_k), \forall k$.
4: for time-step k = K,..., 1 do
5:    for demand and reserve quota b = 1,..., B do
6:       for generator status y = 1,..., Y do
7:          for future state r = 1,..., R do
8:             Find the optimal power generation levels for generators by solving a fuel cost minimization problem with constraints (1)-(6).
9:             Calculate fixed, start and shut-down costs.
10:            Find the instantaneous contribution using (9).
11:         end for future state
12:         Solve the Bellman equation (11) to calculate the expected future value from the current demand and reserve quota, and generator status combination state.
13:       end for generator status
14:    end for demand and reserve quota
15: end for time-step
16: Find the optimal policy for all the time-steps from the states at k = 1.

As described in the algorithm-1, the method first loads the residual demand curves and residual reserve curves for all the time-steps and approximates the end-of-day states $s_{K+1}^{g,s}$ and $s_{K+1}^{g,p}$ using either the knowledge about the problem (i.e. historical data) or by solving a deterministic unit commitment problem over two days (or beyond that) (Line 1-2). Through the approximating the end of day states, we do not have to loop over all the undesired states (backward in time) that does not have a path to the desired end-of-day states.

The value functions for all time-steps are initialized as zeros except for the last time-step where we need to penalize the undesired states or provide a benefit for the desired states (Line 3). The value function at a given time-step is defined as the expected future benefit from every possible available demand quota, reserve quota and generator status combinations (i.e. three dimensional value function).

All the possible combinations of demand quota and reserve quota pairs are generated at a given time-step using the corresponding residual demand curve and residual reserve curve. The total number of quota state pairs and a particular quota state pair are represented using B and b, respectively. A finer discretization of demand and reserve quota states will result in the best solutions. The combined demand and reserve quota for a power producer should be above the minimum power generation limit out of all the committed generators and below the total of the maximum possible power of all the generators of the producer (Line 5).

At a given time-step and a given demand and reserve quota state pair, the total number of all the possible combinations of generator statuses (i.e. on/off statuses for all the generators) and a particular combination is defined as Y and y, respectively. All the possible combinations of generation statuses should satisfy the demand quota, the reserve quota, and the committed forward bilateral contracts without violating any constraints (Line 6).

For a given state combination decide all the possible future states that satisfy the minimum committed and de-committed times, and ramp up and down rates for each generator. If no such state combination exists, then penalize the current state combination. Otherwise loop over all the possible outcomes R (Line 7).

Given the future state r, we have to find the power generated from each of the generators to match the corresponding demand quota, reserve quota and forward bilateral contract power. This is a simple optimization program with the objective to minimize fuel cost. The power generation limits of each generator are modified to satisfy the ramp up/down rates (Line 8).

The fixed cost and the start and shut-down costs are calculated using the on/off statuses of the generators at the next state combination (Line 9). Meanwhile, the instantaneous contribution is calculated using (9) (Line 10). The expected future value from the current state combination is found using Bellman equation (11) (Line 12). This is the maximum of the combined instantaneous contribution in Line 10 and the expected future value for the outcome r out of all the possible outcome states R.

Once we have the value functions for all the time-steps, we can move forward in time from the initial states at k=1 to find the optimal policy (Line 16).

Figure 8:
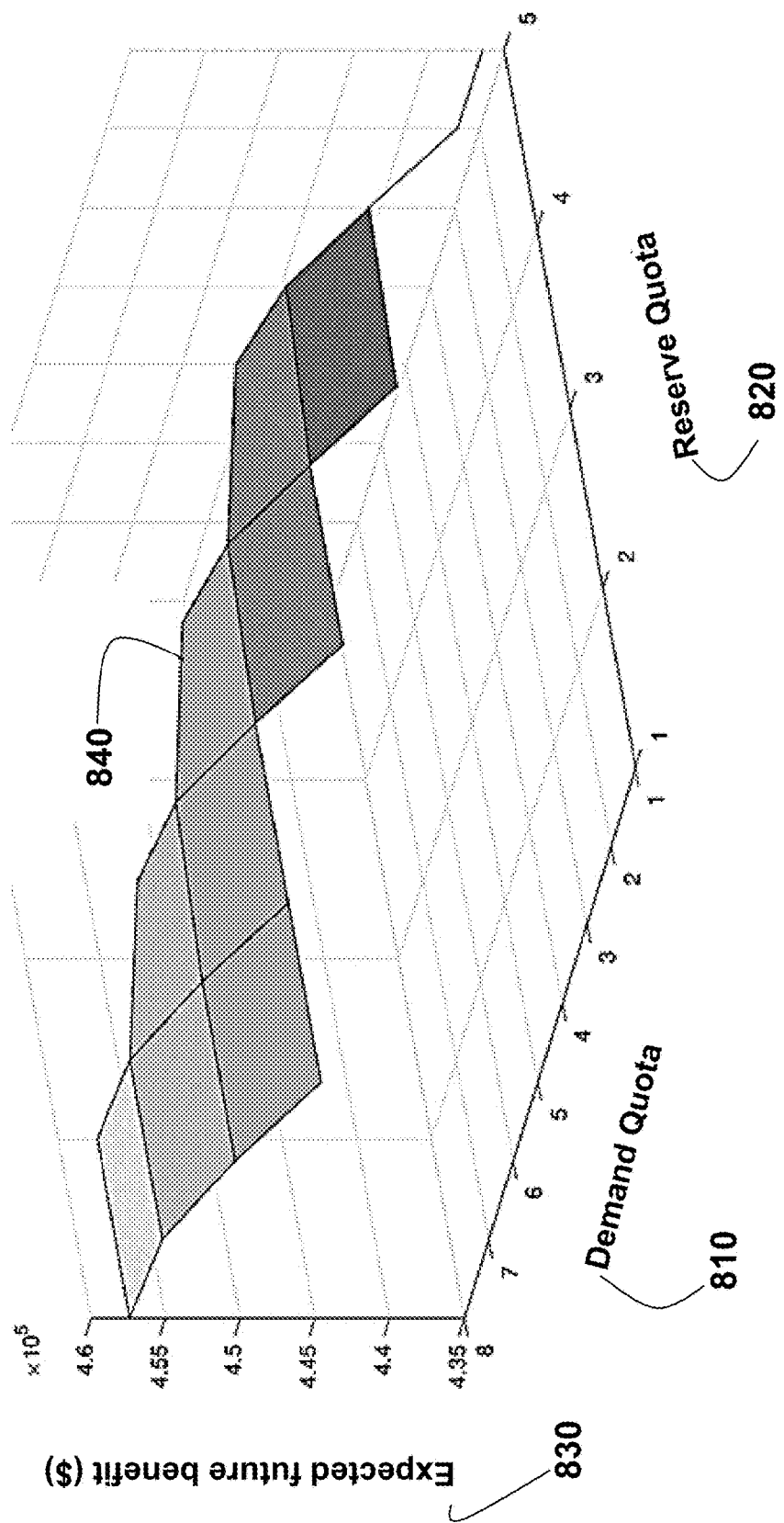
FIG. 8 is a graph illustrating the expected future values at time step k=1, for the combinations of demand quota and reserve quota with a given generation status combination, according to some embodiments of the present disclosure.

FIG. 8 is a graph illustrating the expected future values from demand and reserve quota states with a given generator status combination at time step k=1, according to some embodiments of the present disclosure.

In particular, FIG. 8 illustrates the expected future value 830 from different demand and reserve quota states, 810 and 820 for a given generator status combination at time step k=1. The demand and reserve can have 7 and 5 different bid-points, 840 from low values to high values, respectively. As shown in FIG. 8, there are no future values (no feasible solutions) when both states are high and low because in this situation it violates the power generation limits.

Figure 9A:
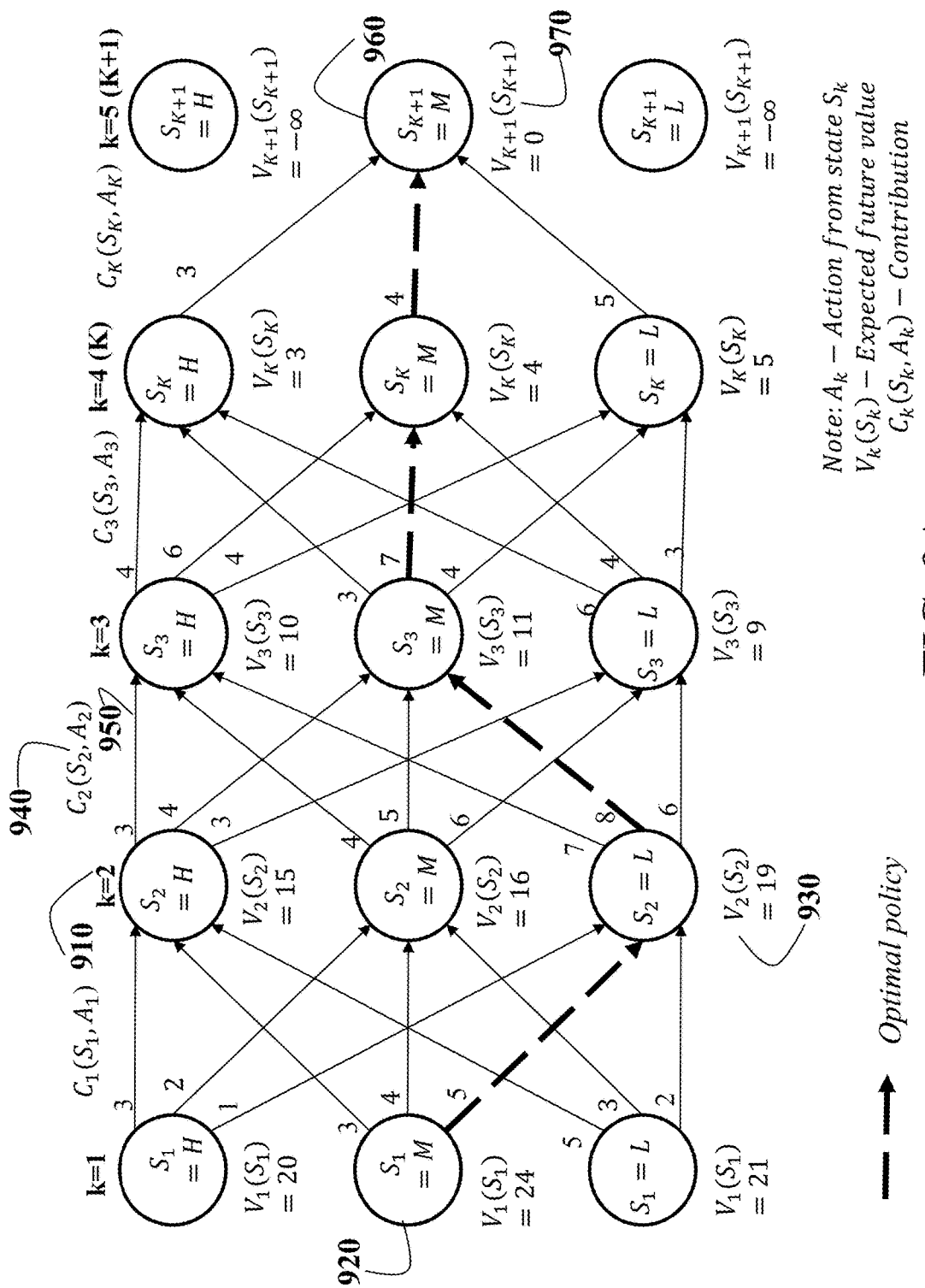
FIG. 9A is a schematic illustrating the decision-making procedure of dynamic programming using backward iteration strategy, according to some embodiments of the present disclosure.

FIG. 9A is a schematic illustrating the decision-making procedure of dynamic programming using backward iteration strategy, according to some embodiments of the present disclosure. Wherein, FIG. 9A illustrates a simplified dynamic programming example of self-scheduling problem using backward iteration strategy.

In FIG. 9A, there are five time-steps, 910 and there are three states, 920 corresponding to different values (H=high, M=medium and L=Low) of demand and reserve quota $S_k$ at each time-step k. Note that each of these states has its own market clearing demand and reserve prices. At k=5 or k=K+1, the desired state is M, 960 so we have penalized the other two undesired states by setting their value functions as negative infinite, but the value function of desired state as zero 970. Note that we have not shown the actions from k=K+1. The expected future value of all the states, 930 are calculated while stepping back in time. The expected future value from every state is the maximum of the combined instantaneous contribution, 940 and the expected future value out of all the possible decisions according to (11). All the possible actions, 950 from a given state should satisfy all the constraints. At k=4 or k=K, the expected future values from H, M, and L states are 3, 4 and 5, respectively, which are only the instantaneous contributions from those states because the expected future value from M state at k=K+1 is zero. The optimal policy (highlighted as dotted lines) is the set of actions that gives the maximum rewards for the power producer from k=1. At k=1, the maximum rewards are achieved from M state.

Using the forward iteration strategy, the state-space approximate dynamic programming method can be described as Algorithm-2:

| | Algorithm 2 |
|---|---|
| 1: | Load residual demand curve and residual reserve curve. |
| 2: | Initialize states at beginning-of-day. |
| 3: | Initialize $V_k(s_k), \forall k$. |
| 4: | for time-step k = 1,..., K do |
| 5: |    for demand and reserve quota b = 1,..., B do |
| 6: |       for generator status y = 1,..., Y do |
| 7: |          for previous state r = 1,..., R do |
| 8: |             Find the optimal power generation levels for generators by solving a fuel cost minimization problem with constraints (1)-(6). |
| 9: |             Calculate fixed, start and shut down costs. |
| 10: |             Find the instantaneous contribution using (9). |
| 11: |          end for previous state |
| 12: |       end for generator status |
| 13: |    end for demand and reserve quota |
| 14: | end for time-step |
| 15: | Calculate the expected future value for all states for each time step. |
| 16: | Find the optimal policy for all the time-steps from the states at k = 0. |

Same as algorithm-1, the algorithm-2 first loads the predicted residual demand curve and residual reserve curve (Line 1). Then, the states at beginning-of-day, k=0 are initialized with known combination of demand and reserve, and generator statuses (Line 2). The future value functions for all time steps are initialized as zero, including the last time k=K (Line 3). The decision process starts at time step k=1, and ends at time step k=K (Line 4).

For each time step k, generate all combination of demand quota and reserve quota pairs that satisfy the minimum and maximum power generation limits (Line 5). B and b are used to present the total number of demand and reserve state pairs and a particular state pair.

At a given time-step and a given demand and reserve quota state pair, generate all possible combinations of generator statuses that satisfy the demand quota, the reserve quota and the committed forward bilateral contracts without violating any constraints (Line 6). Y and y are used to represent the total number of generator state combinations and a particular state combination.

For a given generator state combination, check all the previous generator states to see whether the minimum committed and de-committed times; and ramp up and down times are satisfied for each generator. If no such state combination exists then penalize the current state combination. R and r are used to represent the total number of previous generator states and a particular previous generator state combination (Line 7).

For the given time step, demand and reserve quota and generator status combination, the power generated from each of the generators have to be determined to match the corresponding demand quota, reserve quota and forward bilateral contract power. An optimization problem is formulated with the objective to minimize the total fuel cost of generators, and the constraints of generator generation limits and ramp rates (Line 8).

The fixed cost and the start and shut-down costs then can be determined based on generator status at the current state combination (Line 9). Using (9), the instantaneous contribution can be determined (Line 10). After all contribution function are determined, the expected future value functions for each state combination can be determined using Bellman equation (11) by stepping back in time from last step (Line 15). This is the maximum of the combined instantaneous contribution in Line 10 and the expected future value for the state combination at previous time step.

Based on the determined value functions for all time steps, the optimal policy can be determined by finding a path from the initial states at k=0 to the states at the end of the day, k=K that resulted in maximum value function at k=0 (Line 15).

Figure 9B:
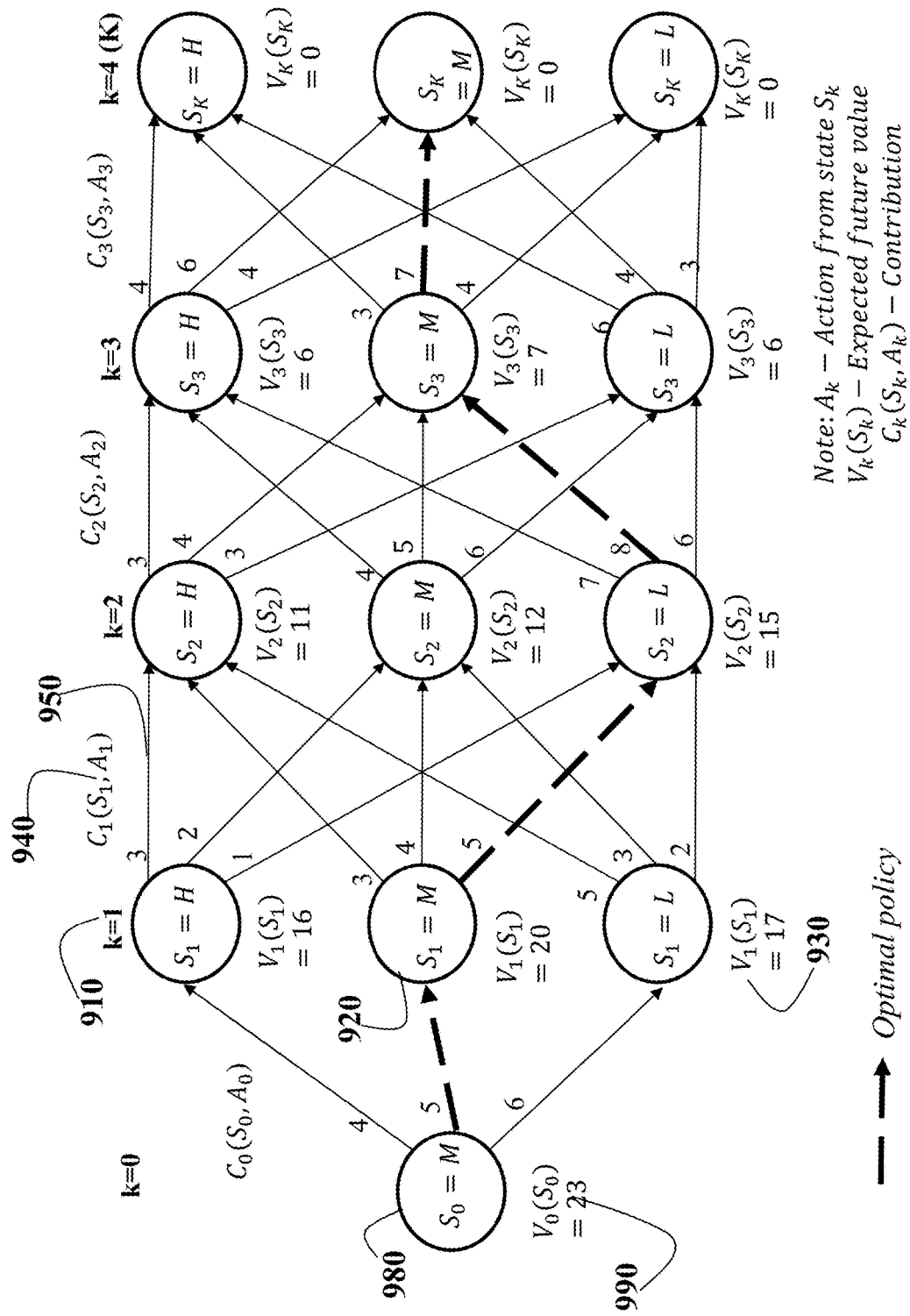
FIG. 9B is a schematic illustrating the decision-making procedure of dynamic programming using forward iteration strategy, according to some embodiments of the present disclosure.

FIG. 9B is a schematic illustrating the decision-making procedure of dynamic programming using forward iteration strategy, according to some embodiments of the present disclosure.

In particular, FIG. 9B illustrates the dynamic programming example same as FIG. 9A but with different solution strategy, forward iteration. In FIG. 9B, there are five time-steps and there are three states corresponding to different values (H=high, M=medium and L=Low) of demand and reserve quota at each time-step. The expected future value from the states at the end of day, k=K is zero. The instantaneous contribution function for all possible actions are calculated from the initial time step k=0, and moving forward until the time step K is reached. All the possible actions from a given state should satisfy all the constraints. The state at initial time step is given, 980. The expected future value of all the states are calculated while stepping back in time. The expected future value from every state is the maximum of the combined instantaneous contribution and the expected future value out of all the possible actions according to (11). The optimal policy is obtained with a set of actions for each time step (highlighted as dotted lines) with a maximum reward, 990 achieved at the given state M at k=0.

Optimal policies from different states can be used to generate the supply offer curves that are submitted for the day-ahead market. If the estimations are accurate enough the resulting optimal quota obtained from the value functions will get accepted by the ISO. Moreover, in real time when the power generated at a certain time-step changes due to unforeseen reasons, the power producers can use the value functions to stay optimal from the next time-step by making real-time bids and real-time decisions. The unforeseen reasons could be when the expected demand quota, or the reserve quota wasn't accepted by the ISO.

Figure 10A:
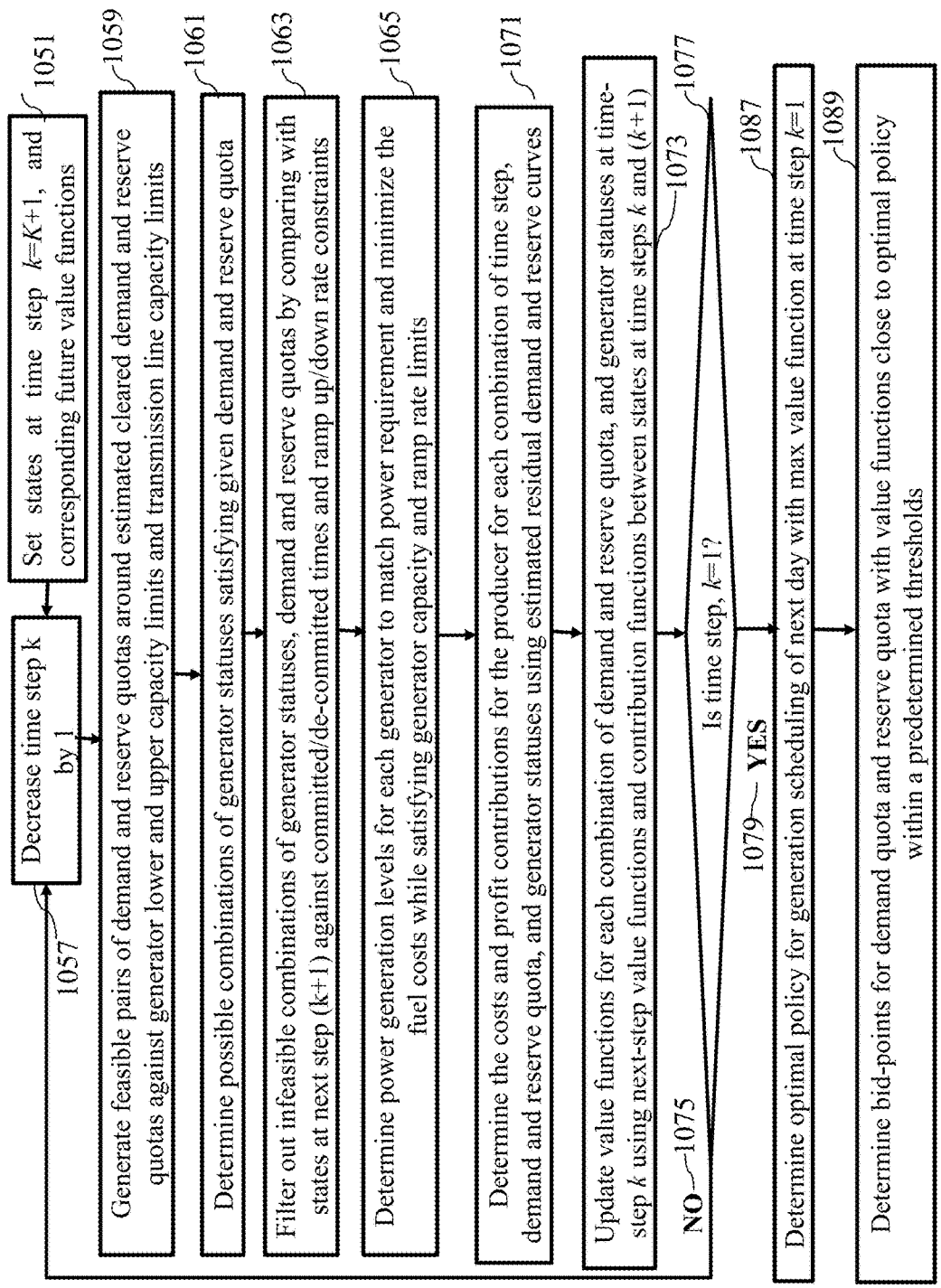
FIG. 10A is a block diagram illustrating some method steps for using backward-iteration strategy to solve the self-scheduling, according to some embodiments of the present disclosure.

FIG. 10A is a block diagram illustrating some method steps for using backward-iteration strategy to solve the self-scheduling, according to some embodiments of the present disclosure.

Wherein, FIG. 10A illustrates the steps for solving self-scheduling problem using backward iteration strategy when the states at the end of the decision horizon are available. The self-scheduling problem is solved through single backward iterative process. It first set the status for the end of the next day, that is, at the time step k=K+1, and the corresponding future values for each state (step 1051). The process is iterating of time step in descending order (step 1057) to execute a set of tasks, including determining feasible pairs of demand quota and reserve quota within pre-determined allowable deviations around estimated cleared demand quota and reserve quota and satisfying generator lower and upper capacity limits and connected line capacity limits (step 1059); determining possible combinations for generator statuses that satisfies the power requirements for determined feasible pair of demand quota and reserve quota (step 1061); by comparing with the states of combination of demand quota and reserve quota, and generator statuses at next time step, filtering out combinations of generator statuses, and demand and reserve quota that not satisfying minimum committed or de-committed times, or ramp up or down rate constraints (step 1063); determining power generation levels for each generator of the power producer to match power requirement introduced by demand and reserve quota states and to minimize the fuel costs while satisfying generator capacity and ramp rate limits (step 1065); determining the generation costs and profit contributions for the power producer for each feasible combination of time step, demand and reserve quota, and generator statuses using estimated residual demand/reserve curves (step 1071); and updating future value functions for each combination of demand and reserve quota, and generator statuses at the current time-step using next-time-step value function and contribution function between the states of the current time-step and the next time-step (step 1073). The optimal policy for generation scheduling is determined by finding a combination of demand and reserve quota, and generator statuses for each time step of next day that has a maximum future value function at the beginning of next day, time step k=1 (step 1087). Moreover, a set of bid-points for demand quotas and reserve quotas whose value functions are close to optimal policy within a pre-determined threshold can be selected to serve as defining supply offer curves of the power producer (step 1089).

Figure 10B:
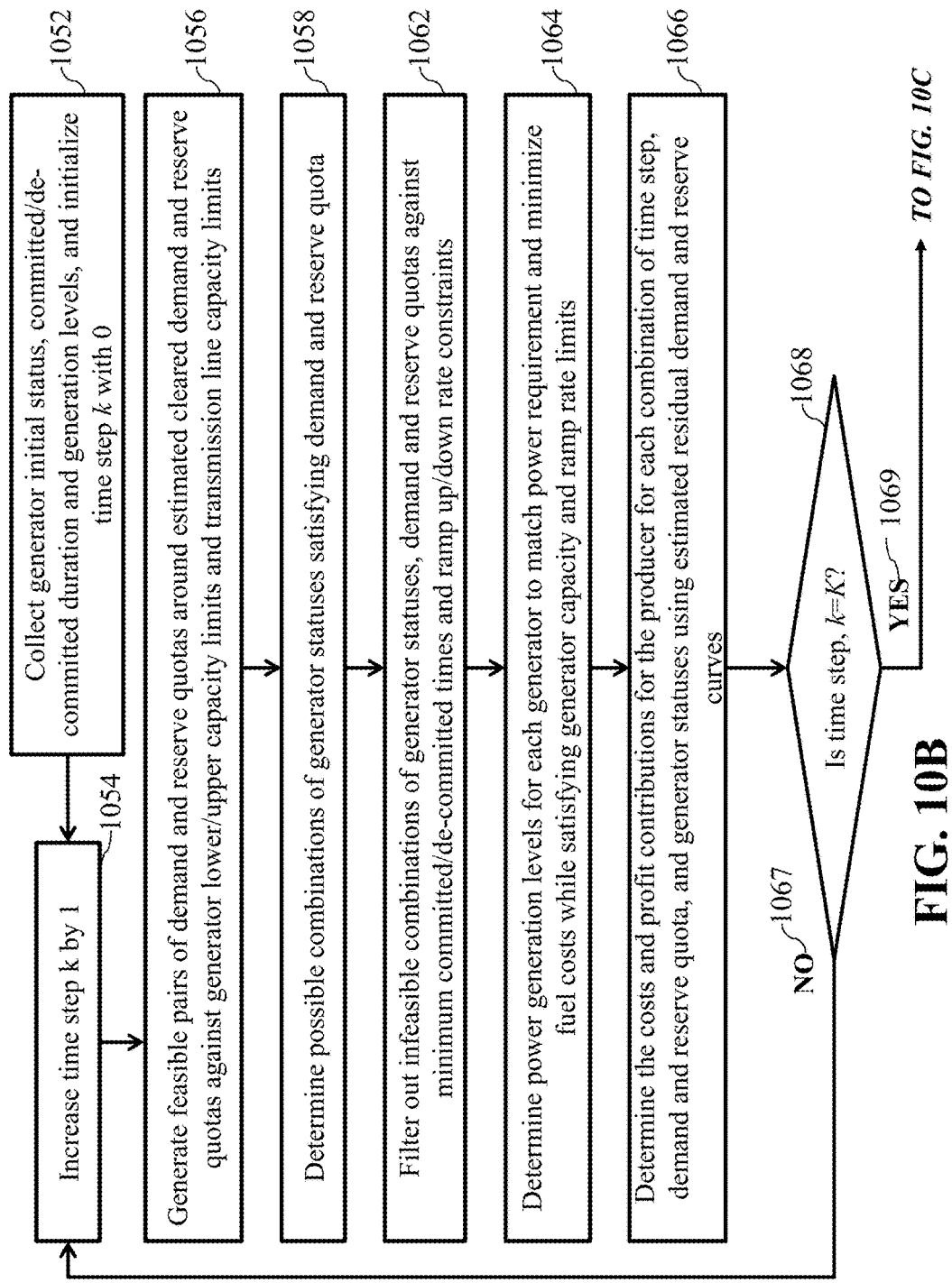
FIG. 10B and FIG. 10C are block diagrams illustrating some method steps for using forward-iteration strategy to solve the self-scheduling problem, according to some embodiments of the present disclosure.
Figure 10C:
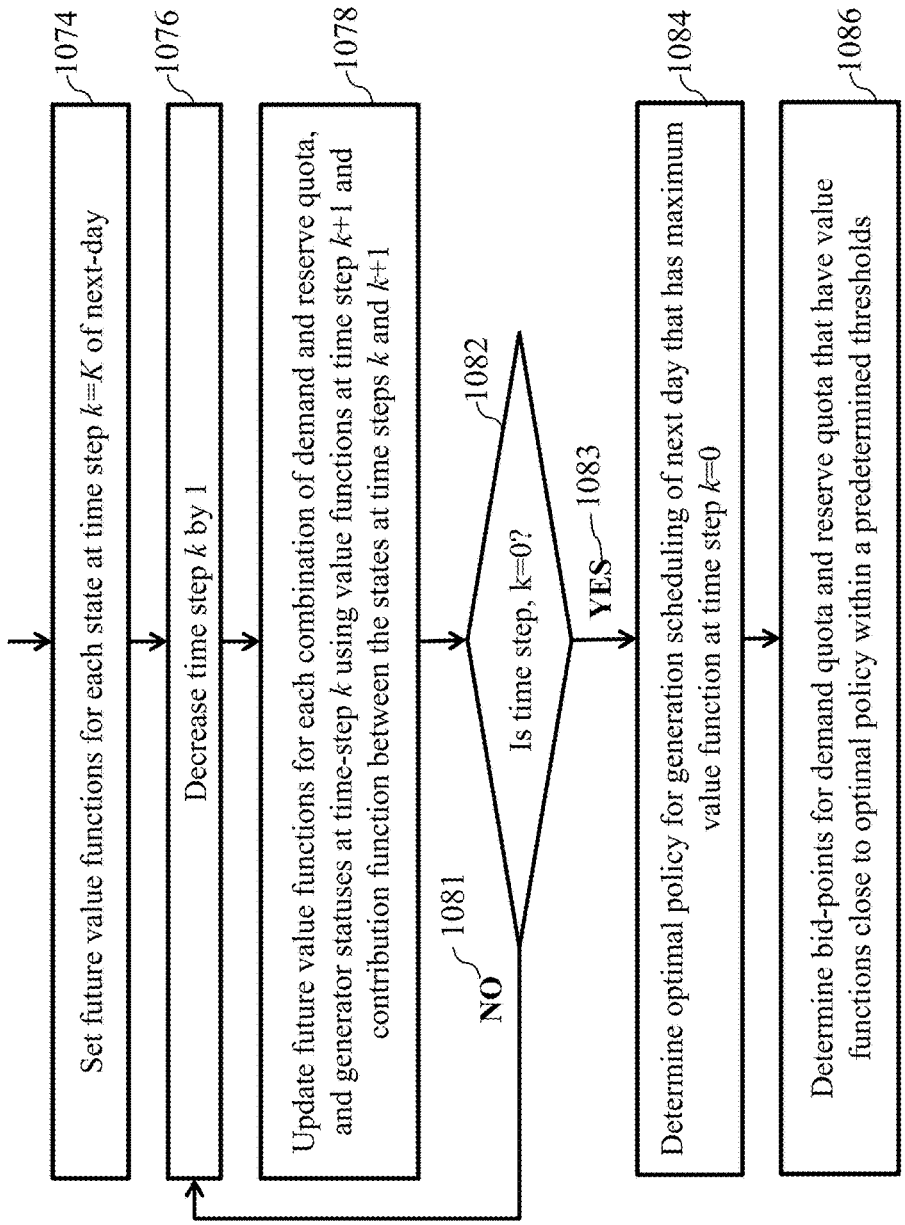

FIG. 10B and FIG. 10C are block diagrams illustrating some method steps for using forward-iteration strategy to solve the self-scheduling problem, according to some embodiments of the disclosure. In particular, FIG. 10B and FIG. 10C illustrate the steps for solving self-scheduling problem using forward iteration strategy for dynamic programming when the states at the beginning of the decision horizon are available.

Referring to FIG. 10B, the self-scheduling problem is solved through two iterative processes. The first process is iterating of time step in ascending order (Step 1054) based on the initial system states (1052) to execute determining feasible pairs of demand quota and reserve quota within pre-determined allowable deviations around estimated cleared demand quota and reserve quota and satisfying generator lower and upper capacity limits and connected line capacity limits (step 1056); determining possible combinations for generator statuses that satisfies the requirements for determined pairs of demand quota and reserve quota (step 1058); filtering out combinations of generator statuses, and demand quota and reserve quota that not satisfying minimum committed or de-committed times, or ramp up or ramp down rate constraints (step 1062); determining power generation levels for each generator of the power producer to match power requirement introduced by demand quota and reserve quota and to minimize the fuel costs while satisfying generator capacity and ramp rate limits (step 1064); and determining the generation costs and profit contributions for the producer for each feasible combination of time-step, demand and reserve quota, and generator statuses using estimated residual demand/reserve curves (step 1066).

Referring to FIG. 10C, the second process is iterating of time step in descending order (Step 1076) to update future value functions for all states in which the ones at the end of next day that is at time step k=K are initialized in step 1074. The future value functions for each combination of demand and reserve quota, and generator statuses at current time step are updated, step 1078 using the value functions at next time step and contribution functions between the states of current time step, and next time step. Same as FIG. 10A, the optimal policy for generation scheduling is determined by finding a combination of demand and reserve quota, and generator statuses for each time step of next day that has a maximum future value function at the first time step of next day (step 1084); and a set of bid-points for demand and reserve quotas whose value functions are close to optimal policy within a pre-determined threshold can be selected to serve as defining supply offer curves of the power producer (Step 1086).

Features

Some aspects of the present disclosure include that the residual demand curve for each time step can be determined by subtracting a combined demanded energy supply offer from other power producers of the electric power system from the received forecast of the demanded energy. Along that the combined demanded energy supply offer for each time step for the future energy generation period, is determined by access of a memory by the processor. Wherein the memory has stored thereon a set of neural networks trained using historical data of demanded energy supply offers from other power producers of the electric power system and historical data of demanded energy and market clearing demand prices of the electric power system, such that each trained neural network output corresponds to a range of market clearing demand prices. Select a neural network from the ranges of market clearing demand prices of the set of stored neural networks, based on a most likely market clearing demand price estimated from the received forecast of the demanded energy of the electric power system. Produce the combined demanded energy supply offer curve using the selected neural network, based on an input of the received forecast of the demanded energy of the electric power system, and the most likely market clearing demand price. Further, the most likely market clearing demand price of the electric power system, is determined by accessing the memory by the processor. Wherein the memory has stored thereon a neural network trained using historical data of cleared demanded energy and market clearing demand prices of the electric power system. Produce the most likely market clearing demand price of the electric power system using the neural network, based on an input of the received forecast of the demanded energy of the electric power system and a stored demanded energy and a stored market clearing demand price for the current energy generation period in the memory.

According to some other aspects of the present disclosure, the present disclosure can include the residual reserve curve for each time step is determined by subtracting a combined reserved energy supply offer from other power producers of the electric power system from the received forecast of the reserved energy. Wherein the combined reserved energy supply offer curve for each time step for the future energy generation period, is determined by accessing a memory, by the processor. Wherein the memory has stored thereon a set of neural networks trained using historical data of reserved energy supply offers from other power producers of the electric power system and historical data of reserved energy and market clearing reserve prices of the electric power system, such that each trained neural network output corresponds to a range of market clearing reserve prices. Selecting a neural network from the ranges of market clearing reserve prices of the set of stored neural networks, based on a most likely market clearing reserve price estimated from the received forecast of the reserved energy of the electric power system. Produce the combined reserved energy supply offer curve using the selected neural network, based on an input of the received forecast of the reserved energy of the electric power system, and the most likely market clearing reserve price. Further, that the most likely market clearing reserve price of the electric power system, is determined by accessing the memory by the processor. Wherein the memory has stored thereon a neural network trained using historical data of cleared reserved energy and market clearing reserve prices of the electric power system. Produce the most likely market clearing reserve price of the electric power system using the neural network, based on an input of the received forecast of the reserved energy of the electric power system, and a stored reserved energy and a stored market clearing reserve price for the current energy generation period in the memory.

According to some other aspects of the present disclosure, the present disclosure can also include determining a most likely demanded energy quantity, a most likely reserved energy quantity, and a most likely reserve used ratio for each time step of the future energy generation period. By accessing the memory by the processor, wherein the memory has stored thereon a neural network trained using historical data of the demanded energy, the reserved energy, a market clearing demand price and a market clearing reserve price for the electric power system and historical data of the demanded energy, the reserved energy and the reserve used ratio for the power generation system. Produce the most likely demanded energy quantity, the most likely reserved energy quantity and the most likely reserve used ratio, using the neural network, based on an input of the received forecasts of the demanded energy, the reserved energy for the electric power system, the most likely market clearing demand price and the most likely market clearing reserve price for the electric power system. Wherein the sections of the residual demand curve and the sections of the residual reserve curve for each time step of the future energy generation period are reduced to a set of combinations of a state of likely demanded energy for the power producer, and a state of likely reserved energy for the power producer. Such that the state of likely demanded energy is one of demanded energy boundary values for the sections of the residual demand curve within a predetermined distance from the most likely demanded energy quantity for that time step. Wherein the state of likely reserved energy is one of reserved energy boundary values for the sections of the residual reserve curve sections within a predetermined distance from the most likely reserved energy quantity for that time step. Further, the processor can determine, for each combination of the state of likely demanded energy, and the state of likely reserved energy for each time step, a set of combinations of states of the generators producing the required quantities of demanded energy and reserved energy for that time step while satisfying constraints on the operation of the generators. Wherein the determination is executed for each time step of the future generation period in ascending order, when the initial state of demanded energy, the initial state of reserved energy, and the initial states of the generators at the beginning of future generation period are given. Such that, the determination is executed for each time step of the future generation period in descending order, when the desired state of demanded energy, the desired state of reserved energy, and the desired states of the generators at the end of future generation period are given. Wherein the processor selects a single combination from the set of combinations of the state of likely demanded energy, the state of likely reserved energy, and the state of generator statuses for each time step to produce a sequence of combinations of the states of the likely demanded energy, the likely reserved energy and the generator statuses maximizing the value function for the entire future energy generation period and produces the schedule of operations according to the sequence of combinations of the states of the generator statuses. Wherein the processor selects a single combination from the set of combinations of the state of likely demanded energy, the state of likely reserved energy, and the state of the generator statuses for each time step of a portion of the future energy generation period to produce a sequence of combinations of the state of the likely demanded energy, the state of likely reserved energy, and the state of generator statuses maximizing the value function for the entire portion of the future energy generation period and produces the schedule of operations according to the sequence of combinations of the states of the generator statuses.

According to some other aspects of the present disclosure, the present disclosure can further include the state of each generator includes an on/off status, a power generated level, a remaining committed time, a remaining de-committed time, a start command and a shut-down command. Wherein the constraints on the operation of the generators include a maximum power generated limit, a minimum power generated limit, a ramp up rate, a ramp down rate, a minimum committed time and a minimum committed time. Such that, the constraints on the quantities of the generated energy include a power balance equation for the demanded energy and a reserved energy used and a maximum power generation requirement for the demanded energy and the reserved energy.

Figure 11:
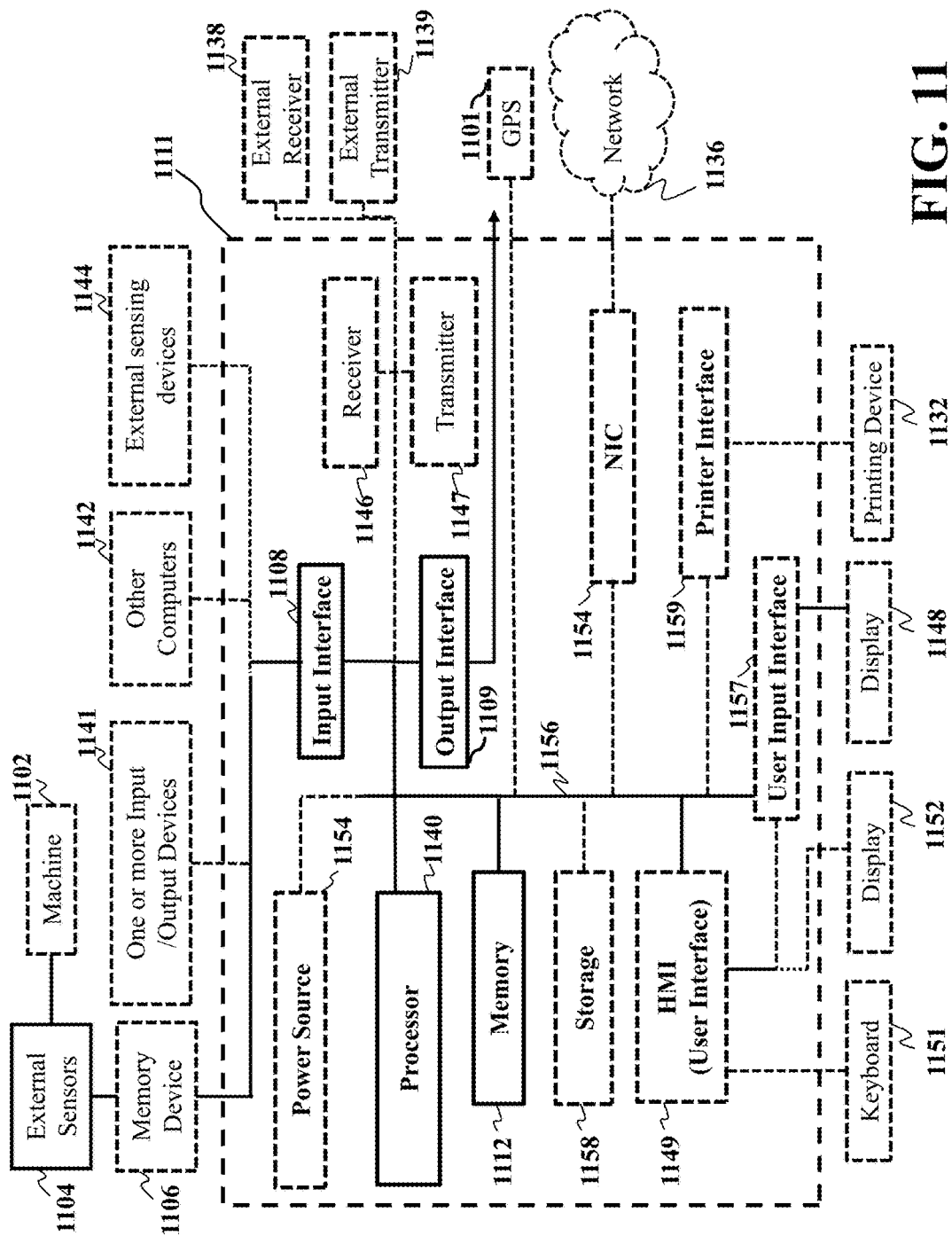
FIG. 11 is a block diagram of illustrating the method of FIG. 1A, that can be implemented using an alternate power producer controller, according to embodiments of the present disclosure.

FIG. 11 is a block diagram of illustrating the method of FIG. 1A, that can be implemented using an alternate power producer controller, according to embodiments of the present disclosure. The controller 1111 includes a processor 1140, computer readable memory 1112, storage 1158 and user interface 1149 with display 1152 and keyboard 1151, which are connected through bus 1156. For example, the user interface 1149 in communication with the processor 1140 and the computer readable memory 1112, acquires and stores the data in the computer readable memory 1112 upon receiving an input from a surface, keyboard surface, of the user interface 1157 by a user.

Contemplated is that the memory 1112 can store instructions that are executable by the processor, historical data, and any data to that can be utilized by the methods and systems of the present disclosure. The processor 1140 can be a single core processor, a multi-core processor, a computing cluster, or any number of other configurations. The processor 1140 can be connected through a bus 1156 to one or more input and output devices. The memory 1112 can include random access memory (RAM), read only memory (ROM), flash memory, or any other suitable memory systems.

Still referring to FIG. 11, a storage device 1158 can be adapted to store supplementary data and/or software modules used by the processor. For example, the storage device 1158 can store historical data and other related data as mentioned above regarding the present disclosure. Additionally, or alternatively, the storage device 1158 can store historical data similar to data as mentioned above regarding the present disclosure. The storage device 1158 can include a hard drive, an optical drive, a thumb-drive, an array of drives, or any combinations thereof.

The system can be linked through the bus 1156 optionally to a display interface (not shown) adapted to connect the system to a display device (not shown), wherein the display device can include a computer monitor, camera, television, projector, or mobile device, among others.

The controller 1111 can include a power source 1154, depending upon the application the power source 1154 may be optionally located outside of the controller 1111. Linked through bus 1156 can be a user input interface 1157 adapted to connect to a display device 1148, wherein the display device 1148 can include a computer monitor, camera, television, projector, or mobile device, among others. A printer interface 1159 can also be connected through bus 1156 and adapted to connect to a printing device 1132, wherein the printing device 1132 can include a liquid inkjet printer, solid ink printer, large-scale commercial printer, thermal printer, UV printer, or dye-sublimation printer, among others. A network interface controller (NIC) 1154 is adapted to connect through the bus 1156 to a network 1136, wherein data or other data, among other things, can be rendered on a third party display device, third party imaging device, and/or third party printing device outside of the controller 1111. Further, the bus 1156 can be connected to a Global Positioning System (GPS) device 1101 or a similar related type device.

Still referring to FIG. 11, the data or other data, among other things, can be transmitted over a communication channel of the network 1136, and/or stored within the storage system 1158 for storage and/or further processing. Further, the data or other data may be received wirelessly or hard wired from a receiver 1146 (or external receiver 1138) or transmitted via a transmitter 1147 (or external transmitter 1139) wirelessly or hard wired, the receiver 1146 and transmitter 1147 are both connected through the bus 1156. The controller 1111 may be connected via an input interface 1108 to external sensing devices 1144 and external input/output devices 1141. The controller 1111 may be connected to other external computers 1142, memory device 1106, external sensors 1104 and machine 1102. An output interface 1109 may be used to output the processed data from the processor 1140.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A power generation system of a power producer for generating and providing electricity to an electric power system operated by an independent system operator (ISO), wherein multiple power producers supply the electricity to the electric power system and multiple power consumers demand the electricity from the electric power system, the power generation system of the power producer comprising:
   a set of generators of the power producer;
   a receiver to receive a forecast of a demanded energy quantity for the electric power system from the ISO for a future energy generation period, and to receive a forecast of a reserved energy quantity for the electric power system from the ISO for the future energy generation period;
   a processor in communication with the receiver, is configured to
      determine a residual demand curve, at each time step of the future energy generation period, relating to a price and a quantity of the demanded energy for that time step, based on the received forecast of the demanded energy for each time step, wherein the residual demand curve includes pluralities of sections, such that a section includes a most likely quantity of the demanded energy for the power producer;
      determine a residual reserve curve at each time step of the future energy generation period, relating to a price and a quantity of the reserved energy for that time step, based on the received forecast of the reserved energy for each time step, wherein the residual reserve curve includes pluralities of sections, such that a section includes a most likely quantity of the reserved energy for the power producer;
      determine a schedule of operations of the set of generators for each time step of the future energy generation period, by optimizing a value function of a difference between a revenue from generating the demanded energy and the reserved energy, and a cost of producing the generated energy, by the power producer; and
   a controller to control the set of generators to produce energy according to the schedule of operations, when the receiver receives an acceptance of the schedule of operations from the ISO.

2. The power generation system of claim 1, wherein the residual demand curve for each time step is determined by subtracting a combined demanded energy supply offer curve from other power producers of the electric power system from the received forecast of the demanded energy.

3. The power generation system of claim 2, wherein the combined demanded energy supply offer curve for each time step for the future energy generation period, is determined by
   access a memory by the processor, wherein the memory has stored thereon a set of neural networks trained using historical data of demanded energy supply offer curves from other power producers of the electric power system and historical data of demanded energy and market clearing demand prices of the electric power system, such that each trained neural network output corresponds to a range of market clearing demand prices;
   select a neural network from the ranges of market clearing demand prices of the set of stored neural networks, based on a most likely market clearing demand price estimated from the received forecast of the demanded energy of the electric power system; and
   produce the combined demanded energy supply offer curve using the selected neural network, based on an input of the received forecast of the demanded energy of the electric power system, and the most likely market clearing demand price.

4. The power generation system of claim 3, wherein the most likely market clearing demand price of the electric power system, is determined by
   access the memory by the processor, wherein the memory has stored thereon a neural network trained using historical data of cleared demanded energy and market clearing demand prices of the electric power system; and
   produce the most likely market clearing demand price of the electric power system using the neural network, based on an input of the received forecast of the demanded energy of the electric power system and a stored demanded energy and a stored market clearing demand price of the electric power system for the current energy generation period in the memory.

5. The power generation system of claim 1, wherein the residual reserve curve for each time step is determined by subtracting a combined reserved energy supply offer curve from other power producers of the electric power system from the received forecast of the reserved energy.

6. The power generation system of claim 5, wherein the combined reserved energy supply offer curve for each time step for the future energy generation period, is determined by
   access a memory, by the processor, wherein the memory has stored thereon a set of neural networks trained using historical data of reserved energy supply offer curves from other power producers of the electric power system and historical data of reserved energy and market clearing reserve prices of the electric power system, such that each trained neural network output corresponds to a range of market clearing reserve prices;
   select a neural network from the ranges of market clearing reserve prices of the set of stored neural networks, based on a most likely market clearing reserve price estimated from the received forecast of the reserved energy of the electric power system; and
   produce the combined reserved energy supply offer curve using the selected neural network, based on an input of the received forecast of the reserved energy of the electric power system, and the most likely market clearing reserve price.

7. The power generation system of claim 6, wherein the most likely market clearing reserve price of the electric power system, is determined by
  access the memory by the processor, wherein the memory has stored thereon a neural network trained using historical data of cleared reserved energy and market clearing reserve prices of the electric power system; and
  produce the most likely market clearing reserve price of the electric power system using the neural network, based on an input of the received forecast of the reserved energy of the electric power system, and a stored reserved energy and a stored market clearing reserve price of the electric power system for the current energy generation period in the memory.

8. The power generation system of claim 1, further comprising:
  determining a most likely demanded energy quantity, a most likely reserved energy quantity, and a most likely reserve used ratio for the power producer for each time step of the future energy generation period, by
  access the memory by the processor, wherein the memory has stored thereon a neural network trained using historical data of the demanded energy, the reserved energy, a market clearing demand price and a market clearing reserve price for the electric power system and historical data of the demanded energy, the reserved energy and the reserve used ratio for the power producer; and
  produce the most likely demanded energy quantity, the most likely reserved energy quantity and the most likely reserve used ratio, using the neural network, based on an input of the received forecasts of the demanded energy and the reserved energy for the electric power system, the most likely market clearing demand price and the most likely market clearing reserve price for the electric power system.

9. The power generation system of claim 8, wherein the sections of the residual demand curve and the sections of the residual reserve curve for each time step of the future energy generation period are reduced to a set of combinations of a state of likely demanded energy for the power producer, and a state of likely reserved energy for the power producer,
  wherein the state of likely demanded energy is one of demanded energy boundary values for the sections of the residual demand curve within a predetermined distance from the most likely demanded energy quantity for that time step, and
  wherein the state of likely reserved energy is one of reserved energy boundary values for the sections of the residual reserve curve sections within a predetermined distance from the most likely reserved energy quantity for that time step.

10. The power generation system of claim 9, wherein the processor determines, for each combination of the state of likely demanded energy, and the state of likely reserved energy for each time step, a set of combinations of states of the generators producing the required quantities of demanded energy and reserved energy for that time step while satisfying constraints on the operation of the generators.

11. The power generation system of claim 10, wherein the determination is executed for each time step of the future generation period in ascending order, when the initial state of demanded energy, the initial state of reserved energy, and the initial states of the generators at the beginning of future generation period are given.

12. The power generation system of claim 10, wherein the determination is executed for each time step of the future generation period in descending order, when the desired state of demanded energy, the desired state of reserved energy, and the desired states of the generators at the end of future generation period are given.

13. The power generation system of claim 10, wherein the processor selects a single combination from the set of combinations of the state of likely demanded energy, the state of likely reserved energy, and the states of generators for each time step to produce a sequence of combinations of the states of the likely demanded energy, the likely reserved energy and the generators maximizing the value function for the entire future energy generation period and produces the schedule of operations according to the sequence of combinations of the states of the generators.

14. The power generation system of claim 10, wherein the processor selects a single combination from the set of combinations of the state of likely demanded energy, the state of likely reserved energy, and the states of the generators for each time step of a portion of the future energy generation period to produce a sequence of combinations of the state of the likely demanded energy, the state of likely reserved energy, and the state of generators maximizing the value function for the entire portion of the future energy generation period and produces the schedule of operations according to the sequence of combinations of the states of the generators.

15. The power generation system of claim 1, wherein the state of each generator includes an on/off status, a power generated level, a remaining committed time, a remaining de-committed time, a start command and a shut-down command.

16. The power generation system of claim 1, wherein the constraints on the operation of the generators include a maximum power generated limit, a minimum power generated limit, a ramp up rate, a ramp down rate, a minimum committed time and a minimum de-committed time.

17. The power generation system of claim 1, wherein the constraints on the quantities of the generated energy include a power balance equation for the demanded energy and a reserved energy used, and a maximum power generation requirement for the demanded energy and the reserved energy.

18. The power generation system of claim 1, wherein each time step is an hour of the day-ahead period.

19. An energy generation system of a power producer for generating and providing electricity to an electric power system operated by an independent system operator (ISO), wherein multiple power producers supply the electricity to the electric power system and multiple power consumers demand the electricity from the electric power system, the energy generation system of the power producer having a set of generators of the power producer, a receiver to receive a forecast of a demanded energy quantity for the electric power system from the ISO for a future energy generation period, and to receive a forecast of a reserved energy quantity for the electric power system from the ISO for the future energy generation period, and the energy generation system of the power producer comprising:
  a processor in communication with the receiver, is configured to
    determine a residual demand curve, at each time step of the future energy generation period, relating to a price and a quantity of the demanded energy for that time step, based on the received forecast of the demanded energy for each time step, wherein the future energy generation period is at least a day-ahead period;

determine a residual reserve curve at each time step of the future energy generation period, relating to a price and a quantity of the reserved energy for that time step, based on the received forecast of the reserved energy for each time step;

determine a schedule of operations of the set of generators for each time step of the future energy generation period, by optimizing a value function of a difference between a revenue from generating the demanded energy and the reserved energy, and a cost of producing the generated energy, by the power producer; and a controller to control the set of generators to produce energy according to the schedule of operations, when the receiver receives an acceptance of the schedule of operations from the ISO.

20. The energy generation system of claim 19, wherein the residual demand curve includes pluralities of sections, such that a section includes a most likely quantity of the demanded energy for the power producer.

21. The energy generation system of claim 19, wherein the residual reserve curve includes pluralities of sections, such that a section includes a most likely quantity of the reserved energy for the power producer.

22. A power generation system of a power producer for generating and providing electricity to an electric power system operated by an independent system operator (ISO), wherein multiple power producers supply the electricity to the electric power system and multiple power consumers demand the electricity from the electric power system, the power generation system of the power producer comprising:

a set of generators of the power producer;

a receiver to receive a forecast of a demanded energy quantity for the electric power system from the ISO for a future energy generation period, and to receive a forecast of a reserved energy quantity for the electric power system from the ISO for the future energy generation period;

a processor in communication with the receiver, is configured to determine a residual demand curve, at each time step of the future energy generation period, relating to a price and a quantity of the demanded energy for that time step, based on the received forecast of the demanded energy for each time step, wherein the residual demand curve includes pluralities of sections, such that a section includes a most likely quantity of the demanded energy for the power producer;

determine a residual reserve curve at each time step of the future energy generation period, relating to a price and a quantity of the reserved energy for that time step, based on the received forecast of the reserved energy for each time step, wherein the residual reserve curve includes pluralities of sections, such that a section includes a most likely quantity of the reserved energy for the power producer, wherein the revenue for generating each quantity of the demanded energy is determined according to the residual demand curve, and the revenue for generating each quantity of the reserved energy is determined according to the residual reserve curve, wherein the cost of producing each quantity of the generated energy depends on a state of each generator of the set of generators, such that the value function optimization is subject to both constraints on an operation of the generators, and constraints on the quantities of the generated energy, as well as subject to the sections of the residual demand curve and the sections of the residual reserve curve;

determine a schedule of operations of the set of generators for each time step of the future energy generation period, by optimizing a value function of a difference between a revenue from generating the demanded energy and the reserved energy, and a cost of producing the generated energy, by the power producer; and a controller to control the set of generators to produce energy according to the schedule of operations, when the receiver receives an acceptance of the schedule of operations from the ISO.

23. An energy generation system of a power producer for generating and providing electricity to an electric power system operated by an independent system operator (ISO), wherein multiple power producers supply the electricity to the electric power system and multiple power consumers demand the electricity from the electric power system, the energy generation system of the power producer having a set of generators of the power producer, a receiver to receive a forecast of a demanded energy quantity for the electric power system from the ISO for a future energy generation period, and to receive a forecast of a reserved energy quantity for the electric power system from the ISO for the future energy generation period, and the energy generation system of the power producer comprising:

a processor in communication with the receiver, is configured to determine a residual demand curve, at each time step of the future energy generation period, relating to a price and a quantity of the demanded energy for that time step, based on the received forecast of the demanded energy for each time step, wherein the future energy generation period is at least a day-ahead period;

determine a residual reserve curve at each time step of the future energy generation period, relating to a price and a quantity of the reserved energy for that time step, based on the received forecast of the reserved energy for each time step, wherein the revenue for generating each quantity of the demanded energy is determined according to the residual demand curve, and the revenue for generating each quantity of the reserved energy is determined according to the residual reserve curve, wherein the cost of producing each quantity of the generated energy depends on a state of each generator of the set of generators, such that the value function optimization is subject to both constraints on an operation of the generators, and constraints on the quantities of the generated energy, as well as subject to the sections of the residual demand curve and the sections of the residual reserve curve;

determine a schedule of operations of the set of generators for each time step of the future energy generation period, by optimizing a value function of a difference between a revenue from generating the demanded energy and the reserved energy, and a cost of producing the generated energy, by the power producer; and a controller to control the set of generators to produce energy according to the schedule of operations, when the receiver receives an acceptance of the schedule of operations from the ISO.

\* \* \* \* \*